(12) United States Patent
Haines et al.

(10) Patent No.: US 7,929,327 B2
(45) Date of Patent: Apr. 19, 2011

(54) ALTERNATIVE-SOURCE ENERGY MANAGEMENT

(75) Inventors: Lance P. Haines, Wilmington, MA (US); Vishwas M. Deokar, Acton, MA (US)

(73) Assignee: American Power Conversion Corporation, West Kingston, RI (US)

( * ) Notice: Subject to any disclaimer, the term of this patent is extended or adjusted under 35 U.S.C. 154(b) by 365 days.

(21) Appl. No.: 12/117,715

(22) Filed: May 8, 2008

(65) Prior Publication Data

US 2009/0027932 A1    Jan. 29, 2009

Related U.S. Application Data

(60) Provisional application No. 60/916,764, filed on May 8, 2007.

(51) Int. Cl.
    H02M 3/24      (2006.01)
    H02M 7/32      (2006.01)
(52) U.S. Cl. .......................................... 363/95; 363/106
(58) Field of Classification Search .................. 363/55, 363/95, 106, 109; 307/30, 38, 39, 102, 113, 307/116, 125, 126, 130, 131, 151
    See application file for complete search history.

(56) References Cited

U.S. PATENT DOCUMENTS

| | | | |
|---|---|---|---|
| 5,747,887 A | 5/1998 | Takanaga et al. | |
| 6,172,432 B1 | 1/2001 | Schnackenberg et al. | |
| 6,215,202 B1 * | 4/2001 | Luongo et al. | 307/64 |
| 6,487,096 B1 | 11/2002 | Gilbreth et al. | |
| 7,129,593 B2 * | 10/2006 | King et al. | 290/4 C |
| 2005/0006958 A1 | 1/2005 | Dubovsky | |
| 2005/0141154 A1 | 6/2005 | Consadori et al. | |
| 2010/0188066 A1 * | 7/2010 | Rodenhiser et al. | 323/302 |

FOREIGN PATENT DOCUMENTS

WO    WO2006/106418 A    10/2006

OTHER PUBLICATIONS

SMARTRE™ Grid Interactive Solution Brochure, Outback Power™, 4 pages, retrieved off the internet on Mar. 20, 2009 at http://outbackpower.com/pdf/brochures/smartre.pdf.

(Continued)

*Primary Examiner* — Matthew V Nguyen
(74) *Attorney, Agent, or Firm* — Kilpatrick Townsend & Stockton LLP

(57) ABSTRACT

A power converter system includes a power converter system including: a DC-to-AC power converter; a first output configured to be coupled to a power grid; a first input configured to be coupled to the power grid; second outputs each configured to be coupled to a corresponding AC load; a power-grid switch coupled to the converter and to the first output; load switches coupled to the converter, the second outputs, and the first input; and a controller coupled to the load switches and to the first output and configured to determine whether energy from the power grid satisfies at least one criterion, the controller being further configured to control the power-grid switch and the load switches to couple the converter to the first output and to couple the first input to the second outputs if the at least one criterion is satisfied and otherwise to control the power-grid switch and the load switches to isolate the converter from the first output and to couple the converter to at least one of the second outputs.

18 Claims, 12 Drawing Sheets

OTHER PUBLICATIONS

Grid-Interactive, GTFX and GVFX Inverter/Charger Programing Manual, Outback Power Systems™, 32 pages, retrieved off the internet on Mar. 20, 2009 at http://outbackpower.com/pdf/manuals/gtfx_gvfx.pdf.

Xantrex™ XW Hybrid Inverter/Charger, The NEXT generation inverter/charger for renewable energy systems and backup power applications, Smart Choice for Power™, 2 pages, retrieved off the internet on Mar. 20, 2009 at http://www.xantrex.com/web/id/1858/DocServe.aspx.

Xantrex™ Solar Charge Controller XW-MPPT60-150, Smart Choice for Power™, 2 pages, retrieved off the internet on Mar. 20, 2009 at http://www.xantrex.com/web/id/1859/DocServe.aspx.

Xantrex™ XW Power Distribution Panel XW Connection Kit XW Conduit Box, Smart Choice for Power™, 2 pages, retrieved off the internet on Mar. 20, 2009 at http://www.xantrex.com/web/id/1860/DocServe.aspx.

Xantrex™ XW Automatic Generator Start, Smart Choice for Power™, 2 pages, retrieved off the internet on Mar. 20, 2009 at http://www.xantrex.com/web/id/1862/DocServe.aspx.

Xantrex™ XW System Control Panel, Smart Choice for Power™, 2 pages, retrieved off the internet on Mar. 20, 2009 at http://www.xantrex.com/web/id/1861/DocServe.aspx.

Xantrex™ Brochure 8 pages, retrieved off the internet on Mar. 20, 2009 at http://www.xantrex.com/web/id/2053/docserve.aspx.

SMA Solar Technology, Sunny Island 5048U., SMA America, Inc., 1 page, retrieved off the internet under the Overview Tab on Mar. 17, 2009 at http://www.sma-america.com/en_US/products/off-grid-inverters/sunny-island-5048u.html.

SMA Solar Technology, Sunny Island 5048U., SMA America, Inc., 2 pages, retrieved off the internet under the Technical Data Tab on Mar. 19, 2009 at http://www.sma-america.com/en_US/products/off-grid-inverters/sunny-island-5048u.html.

SMA America, Inc., Sunny Island 5048U Data Sheet, 2 pages, retrieved off the internet on Mar. 20, 2009 at http://download.sma.de/smaprosa/dateien/5610/SUNNYISLA5048-DUS084110.pdf.

* cited by examiner

ALTERNATIVE-SOURCE ENERGY MANAGEMENT

CROSS-REFERENCES TO RELATED APPLICATIONS

This application claims the benefit of U.S. Provisional Application Ser. No. 60/916,764 filed May 8, 2007, which is incorporated herein in its entirety.

BACKGROUND

Today, companies and persons rely on having a consistent supply of power to electronic devices more than ever before. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills). With such a heavy reliance on power, individuals and companies frequently like to be able to have power outages corrected in short order, and/or have backup power supplies so that their affairs and/or businesses are not significantly affected.

Alternative energy sources, such as solar energy, are desirable sources of energy for both home use and commercial use. For home use, users may need alternative energy sources due to their homes not being connected to a power grid, or may desire alternative energy sources to supplement power from a power grid. For off-grid houses, solar panels may be used to receive solar energy, convert the solar energy to electrical energy, and store the electrical energy in batteries for future use. For example, the batteries may be used to provide power at night or other times when the solar energy is unavailable. These off-grid systems can be complex, expensive, and physically large. For on-grid houses, systems for converting solar energy do not use batteries and run in parallel with the power grid. If the power grid is within specifications, then energy obtained through the solar system is used locally as desired, with excess energy provided by the solar systems being sent to the grid, and energy above that provided by the solar system being used to power the loads being drawn from the grid.

For on-grid solar energy systems, safety issues exist with respect to servicing the power grid during brownouts or blackouts. When utility power is out of specification (e.g., a brownout or a blackout), energy needs to be inhibited from entering the grid during repair of the grid so that workers repairing the grid are not electrocuted when working downstream from a power source.

SUMMARY

An exemplary power converter system in accordance with the disclosure includes a power converter system including: a DC-to-AC power converter; a first output configured to be coupled to a power grid; a first input configured to be coupled to the power grid; second outputs each configured to be coupled to a corresponding AC load; a power-grid switch coupled to the converter and to the first output; load switches coupled to the converter, the second outputs, and the first input; and a controller coupled to the load switches and to the first output and configured to determine whether energy from the power grid satisfies at least one criterion, the controller being further configured to control the power-grid switch and the load switches to couple the converter to the first output and to couple the first input to the second outputs if the at least one criterion is satisfied and otherwise to control the power-grid switch and the load switches to isolate the converter from the first output and to couple the converter to at least one of the second outputs.

Embodiments of such power converter systems may include one or more of the following features. The controller is configured to provide a mode indication signal to the converter depending upon whether the at least one criterion is satisfied. The converter is configured to operate in a CSI mode or in a VSI mode in accordance with the mode indication signal received from the controller. In the CSI mode the converter is configured to provide energy at the voltage of the first output with a corresponding current according to an amount of power available from the converter, and where in the VSI mode the converter is configured to provide energy at a predetermined voltage with a current determined by the AC loads coupled to the second outputs. The predetermined voltage is approximately the same as a voltage provided by the power grid when the power grid is operational. The at least one criterion includes at least one of an acceptable range of voltage and an acceptable range of frequency. The controller is further configured to determine that the system is not unintentionally islanding. The controller is coupled to the second outputs and is configured to control the AC load switches to change a distribution of power provided by the converter to portions of the second output if power provided to the second outputs is above an amount of power available to the converter. The controller is configured to cause the AC load switch associated with the lowest-priority, presently-connected, non-delayable AC load to isolate the converter from the corresponding second output if the power provided to the second outputs is above the amount of power available to the converter. The load switches are configured to be positioned in a first state connecting the second outputs to the converter, in a second state connecting the second outputs to the first input, and in a third state connecting the second outputs to neither the converter nor the first input. Systems may include a second input configured to be coupled to an AC power source separate from the power grid where the load switches are further coupled to the second input. The load switches are configured to be positioned in a first state connecting the second outputs to the converter, in a second state connecting the second outputs to the first input, in a third state connecting the second outputs to the second input, and in a fourth state connecting the second outputs to neither the converter nor the first input nor the second input.

A further exemplary power converter system in accordance with the disclosure includes a power converter system including: a first input configured to receive a DC voltage from a first DC power source; a second input configured to couple to a power grid; a first output configured to couple to the power grid; second outputs each configured to couple to a corresponding AC load; a power routing module coupled to the first output and the second outputs; and a DC-to-AC converter coupled to the first input and the power routing module, the converter being configured to selectively operate in either a first or second mode, in the first mode the converter acting as a current source to convert the DC voltage received from the first input and to provide an AC current to the power routing module, and in the second mode the converter acting as a voltage source to convert the DC voltage received from the first input and to provide an AC voltage of a predetermined level.

Embodiments of such power converter systems may include one or more of the following features. The converter is configured to effect the first and second modes in response to a first indication that the power grid is connected to the first output and in an acceptable state and an unacceptable state, respectively. Systems may include a controller coupled to the first output and the converter and configured to determine at least one of whether a voltage from the power grid is acceptable, whether a frequency of energy from the power grid is acceptable, and whether the system is unintentionally islanding, and to provide the first indication to the converter. The controller is coupled to the power routing module and configured to provide a second indication of an acceptability of energy received by the system from the power grid, and the power routing module is configured to route energy from the converter to the first output if the received grid energy is acceptable and to selectively route energy from the converter to the second outputs if the received grid energy is unacceptable. The power routing module is coupled and configured to selectively route energy from the second input to the second outputs if the received grid energy is acceptable. Systems may include a DC disconnect module coupled to the first input and configured to be manually operated to selectively connect/disconnect a DC voltage source to/from the converter. Systems may include a third input configured to couple to an AC power source separate from the power grid. Systems may include: a second DC power source including an energy storage device; and a bidirectional DC-to-DC converter coupled to the energy storage device and to the DC-to-AC converter.

A further exemplary power converter system in accordance with the disclosure includes a power converter system including: a DC-to-AC power converter configured to receive DC power from at least one DC power source; a grid switch coupled to the converter and configured to couple to a power grid; selective couplings coupled to the converter, the selective couplings including load lines configured to be coupled to AC loads, the selective couplings being configured to selectively couple the converter to the load lines; and a controller coupled to the selective couplings and configured to be coupled to the power grid, the controller being configured to determine whether energy from the power grid satisfies at least one criterion and to control the grid switch to isolate the converter from the power grid, and to control the selective couplings to couple the converter to at least one of the load lines, if the at least one criterion is unsatisfied, the controller being further configured to control the selective couplings to change a distribution of power provided by the converter to the load lines if power provided to the load lines is above an amount of power available to the converter.

Embodiments of such power converter systems may include one or more of the following features. The controller is configured to cause the selective couplings to change a distribution of power provided by the converter to the load lines dependent upon at least one criterion other than power drawn on the load lines. The controller is configured to cause the selective coupling associated with a presently-connected, lowest-priority, non-delayable AC load to isolate the converter from the respective load line if power provided to the load lines is above an amount of power available to the converter. Systems may include an energy storage module coupled to the converter and the controller, where the controller is configured to disconnect a presently-connected delayable load from the converter before attempting to use energy from the energy storage module to power presently-connected loads if power available from the converter from the at least one solar panel is insufficient to power the presently-connected loads. Each of the selective couplings are configured to be positioned in a first state connecting a respective one of the load lines to the converter, in a second state connecting a respective one of the load lines to the power grid, and in a third state connecting a respective one of the load lines to neither the converter nor the power grid. The selective couplings are further configured to couple to an AC power source separate from the power grid. Each of the selective couplings are configured to be positioned in a first state connecting a respective one of the load lines to the converter, in a second state connecting a respective one of the load lines to the power grid, in a third state connecting a respective one of the load lines to the AC power source, and in a fourth state connecting a respective one of the load lines to neither the converter nor the power grid nor the AC power source. The DC-to-AC power converter is configured to receive DC power from a first DC power source through a unidirectional connection, and the system may include: a second DC power source including an energy storage device; and a bidirectional DC-to-DC converter coupled to the energy storage device and to the DC-to-AC power converter. The controller is configured to connect and disconnect loads to and from the converter based upon permitted sources of power for respective loads.

A further exemplary power converter system in accordance with the disclosure includes a power converter system including: a DC-to-AC power converter; outputs each configured to be coupled to an AC load; load switches coupled to the converter and the outputs; and a controller coupled to the load switches and to the outputs and configured to control the load switches to selectively couple the converter to the outputs to selectively provide AC power from the DC-to-AC power converter to the outputs dependent upon at least one characteristic associated with the outputs other than power drawn on the outputs.

Embodiments of such power converter systems may include one or more of the following features. Systems may include a first DC source that is unidirectionally coupled to the DC-to-AC power converter to supply DC power to the DC-to-AC power converter, and the system may include: a second DC source including an energy storage device; and a bidirectional DC-to-DC converter coupled to the energy storage device and to the DC-to-AC power converter. Systems may include a bidirectional DC-to-DC converter coupled to the DC-to-AC converter and configured to couple to an energy storage device. The first DC source includes at least one of a DC-output generator and at least one solar panel. The at least one characteristic is at least one of whether a particular output is permitted to receive power from a particular source, and whether a particular output is associated with a delayable AC load. Systems may include an AC generator coupled to the load switches.

An exemplary method of regulating power delivery by a power delivery system includes: determining whether a power grid with acceptable first AC power available is connected to the power delivery system; receiving first DC power at a DC-to-AC converter from a first DC power source other than an energy storage device and converting the received first DC power from the first DC power source to second AC power; providing the second AC power to the power grid if it is determined that a power grid with acceptable power available is connected to the power delivery system; and providing the second AC power to a first AC load, of multiple AC loads, connected to the power delivery system if it is determined that no power grid with acceptable power available is connected to the power delivery system; where the second AC power is provided to the first AC load dependent upon at least one characteristic of the first AC load in addition to power draw of the AC load.

Embodiments of such a method may include one or more of the following features. The at least one characteristic includes delayability of the respective load. The at least one characteristic includes permission of the respective load to receive power derived from the first DC source. Providing the second AC power to the first AC load includes providing the second AC power in an amount only up to a threshold amount. Methods may include providing third AC power to a second AC load of the AC loads dependent upon whether the second AC load is permitted to receive power derived from a source of the third AC power. Methods may include receiving second DC power at the DC-to-AC converter from a second DC power source, including an energy storage device, and converting the received second DC power from the second DC power source to the third AC power. Methods may include receiving the third AC power from an AC generator. Methods may include: receiving second DC power at the DC-to-AC converter from a second DC power source, including an energy storage device, and converting the received second DC power from the second DC power source to fourth AC power; receiving fifth AC power from an AC generator; and combining the fourth and the fifth AC power to form the third AC power. The first and second AC loads are physically separate such that the second and third AC powers are provided to physically separate loads.

An exemplary method of regulating power delivery by a power delivery system includes: providing characteristics of AC loads; providing indications of alternative power sources, which of the alternative power sources are permitted to power which of the AC loads, and priority of use of the alternative power sources, where the alternative power sources are connected to the power delivery system, where the alternative power sources are different from a power grid; and powering the at least one of the AC loads using at least one of the alternative power sources, without using a power grid, based on the characteristics of the AC loads, the priority of use of the alternative power sources, and which of the alternative power sources are permitted to power which of the AC loads.

Embodiments of such a method may include one or more of the following features. The characteristics include load delayability. The alternative power sources include a source of renewable DC power, and methods may include: determining whether a power grid with acceptable AC power available is connected to the power delivery system; and providing power to the power grid from the source of renewable DC power if it is determined that a power grid with acceptable power available is connected to the power delivery system. Powering the AC loads includes powering the AC loads without exceeding a power threshold. Powering the AC loads includes discontinuing to power a particular one of the AC loads if a power drawn by the powered loads exceeds an available power presently provided by the alternative power sources to the AC loads. The discontinuing includes selecting the particular one of the AC loads based upon at least one of the load characteristics. The discontinuing includes selecting the particular one of the AC loads based upon the priority of use of the alternative power sources.

Various embodiments discussed herein may provide one or more of the following capabilities. Solar energy may be used in a grid-tied photovoltaic (PV) converter to provide power to a user (e.g., a house) during times when grid power is out of specification. A solar energy system can act as both a grid-tied system and an off-grid system, i.e., acting in either an off-grid mode or an on-grid mode. Power from a limited power source may be effectively allocated to one or more loads. Electrocution of persons working on a power grid downstream from a house or other entity using a solar energy system can be inhibited. A grid-tied and photovoltaic system can be made more robust than previous systems. Energy efficiency can be improved in a grid-tied photovoltaic system.

These and other capabilities will be more fully understood after a review of the following figures, detailed description, and claims.

DETAILED DESCRIPTION OF PREFERRED EMBODIMENTS

The disclosure provided herein describes, among other things, techniques, embodied in methods and/or apparatus, for providing solar energy to a grid-tied building. For example, solar panels may be connected to a DC-to-AC converter (i.e., an inverter) via a DC disconnect. The converter is selectively coupled via switches to AC loads of the building and selectively coupled to the power grid. When the power grid is within specifications, the converter provides energy from the solar panels to the grid and while the grid is out of specification, the converter is coupled through the respective switches to provide energy from the solar panels to the loads. A controller monitors the status of the grid voltage and controls the switches coupling the converter to the grid and the loads such that the converter is isolated from the grid and connected to the loads when the grid is out of specification and the converter is connected to the grid when the grid is within specifications. Further, the controller can regulate the switches coupling the converter to the loads to effectively use the power from the solar panels if insufficient power is available for appropriately powering all of the loads. Other embodiments are within the scope of the description and claims.

Figure 1:
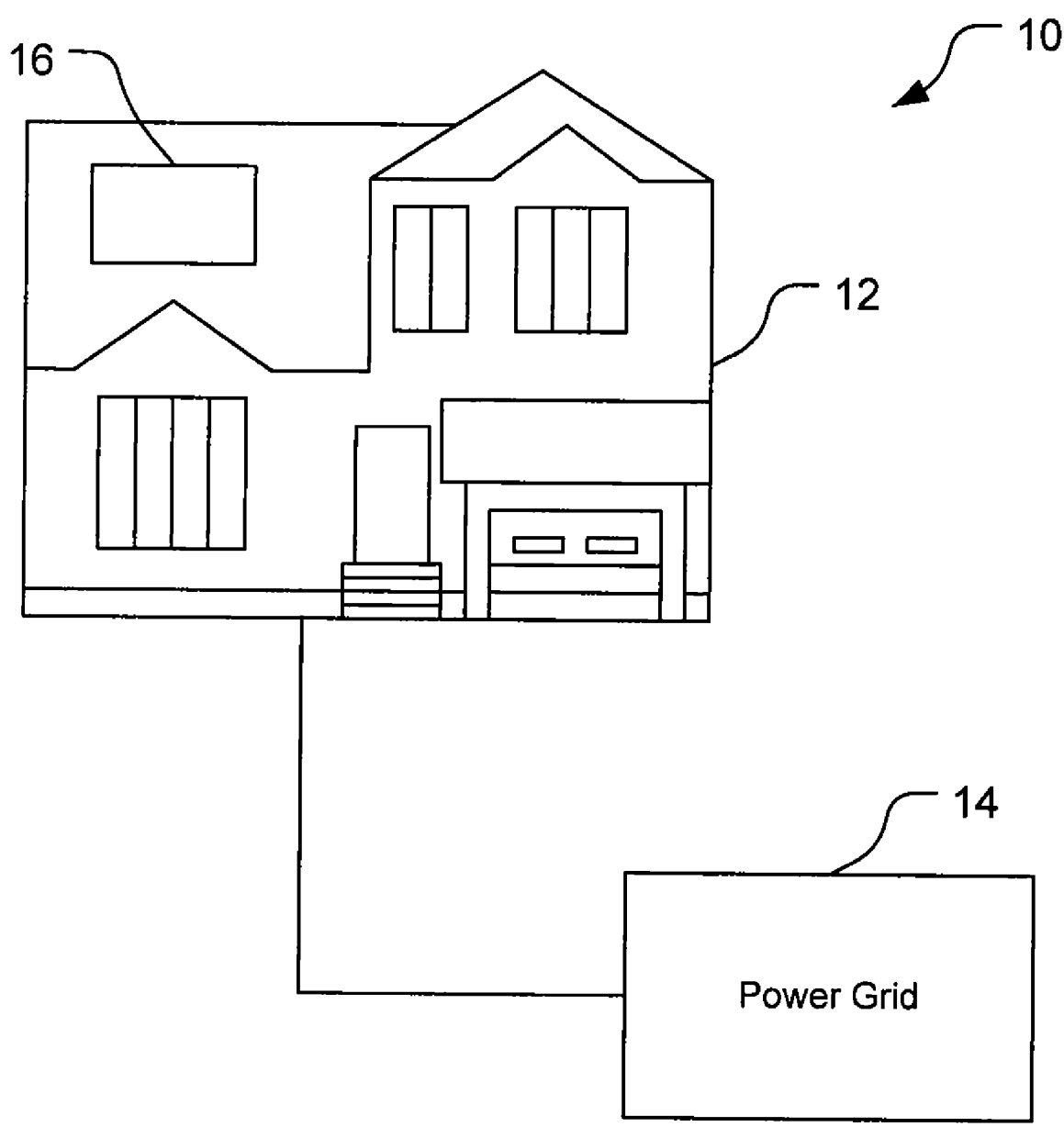
FIG. 1 is a diagram of an arrangement with a home connected to receive power from both a power grid and solar panels.

Referring to FIG. 1, a powered-home arrangement 10 includes a house 12 and a power grid 14. The power grid 14 is connected to loads within the house 12 for powering the loads (not shown). On the house, there is a set of solar panels 16 configured to convert solar energy to electric energy for powering the loads of the house 12. The solar panels 16 can also convert solar energy to electrical energy for supply to the power grid 14 to reduce the energy bills that need to be paid by the owner of the house 12 for the power from the grid 14.

For example, energy supplied from the solar panel 16 via appropriate circuitry in the house 12 to the power grid 14 may cause a power meter attached to the house 12 for monitoring power received from the power grid 14 to run backwards, indicating power being supplied from the house 12 to the power grid 14.

Figure 2:
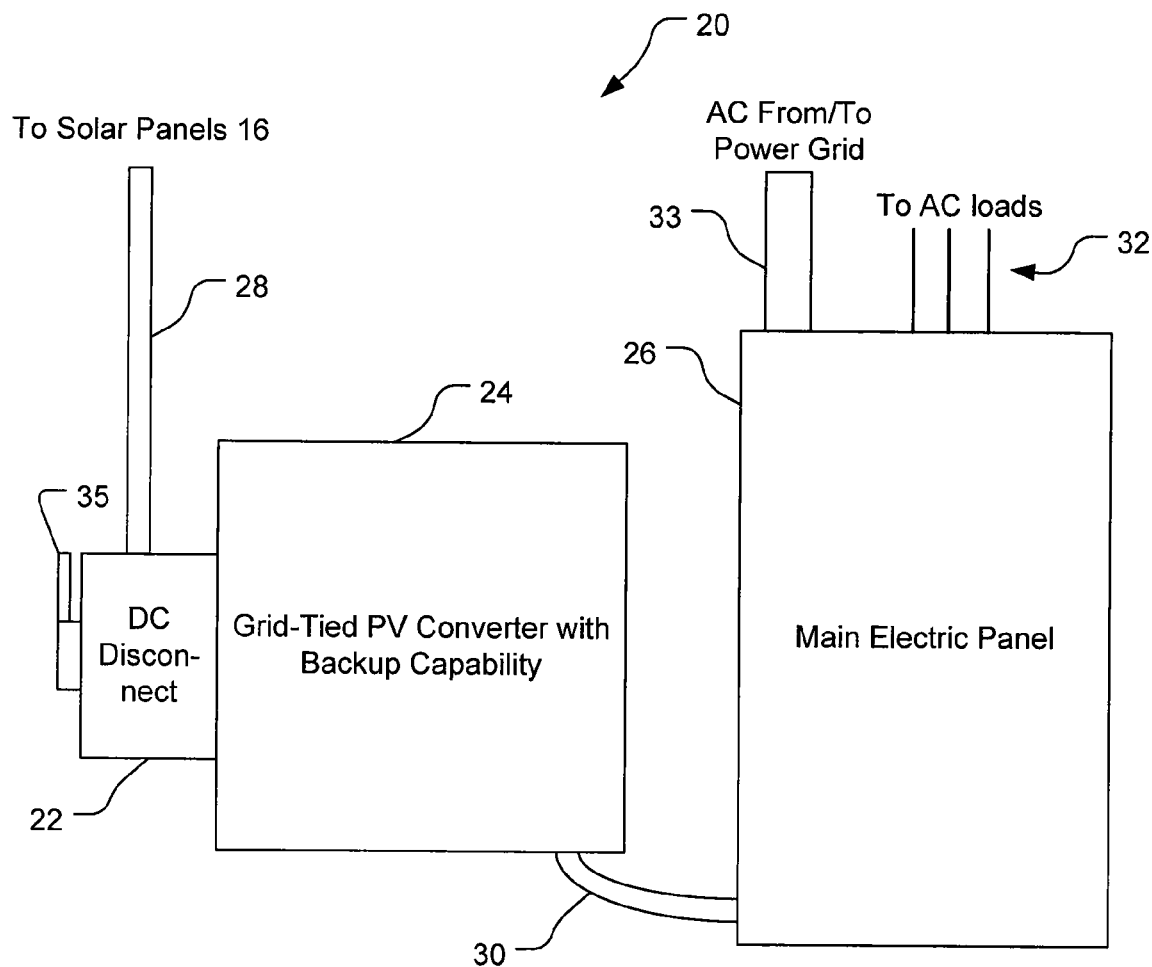
FIG. 2 is a block diagram of a split-phase grid-tied photovoltaic converter system.

Referring to FIG. 2, an energy distribution system 20 includes a DC disconnect circuit 22, a power distribution and conversion module 24, and a main electric panel 26. The system 20 may be fully or partially within the house 12. As shown, the DC disconnect 22 is coupled via a line 28 to the solar panels 16. The DC disconnect 22 is further coupled to the power distribution and conversion module 24, which is connected via a line 30 to the electric panel 26. The line 30 may in fact contain multiple electrical lines and may be contained within a single mechanical conduit. The main electric panel 26 is connected via one or more lines 32 to appropriate AC loads within the house 12 and via appropriate lines 33 to the power grid.

Figure 3:
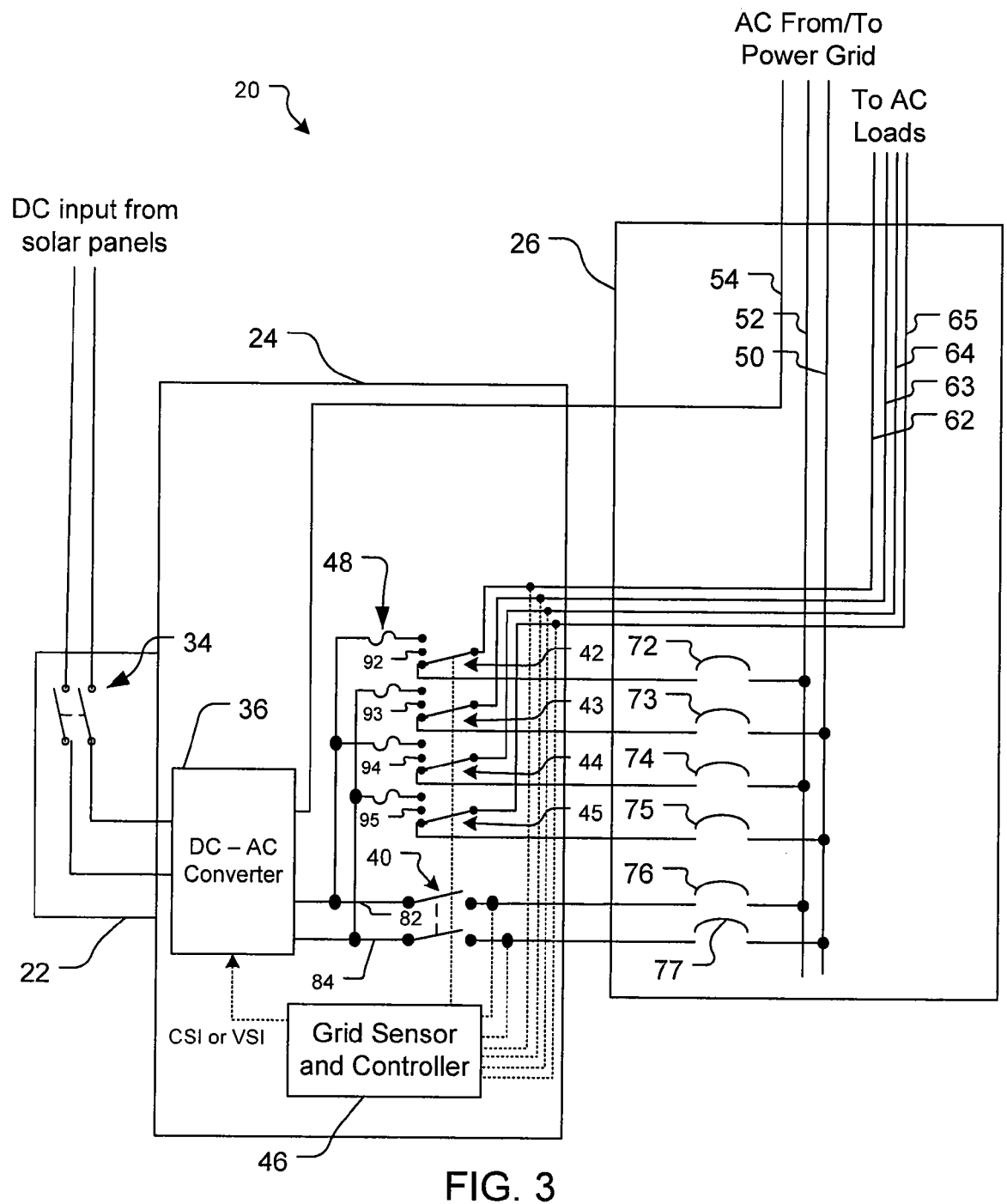
FIG. 3 is a block diagram of the system shown in FIG. 2.

Referring also to FIG. 3, the DC disconnect circuit 22 contains a switch 34. The switch 34 is a multi-pole switch configured to selectively connect the solar panels 16 to the module 24. The switch 34 is mechanically operable using a handle 35 to connect the panel 16 to the module 24 or to isolate the panel 16 from the module 24, e.g., for service of the module 24. In its typical operating mode, however, the switch 34 is closed, thereby connecting the panel 16 to the module 24, and this mode is assumed for further discussion below.

The module 24 includes a DC-to-AC converter 36, a grid switch 40, load switches 42-45, a combined controller and grid voltage sensor 46, and fuses 48, and the electric panel 26 includes lines 50, 52, 54, connected to the power grid 14, lines 62-65 connected to AC loads, and circuit breakers 72-77. The controller and sensor 46 is referred to below as the controller 46 or the sensor 46. Also, while only four switches 42-45 and corresponding fuses 48 and load lines 62-65 are shown, other quantities may be used. Each of the switches 42-45 can be placed in any of three states, connecting its corresponding load line 62-65 to the corresponding power line 50, 52, connecting its load line 62-65 to the converter 36, or connecting its load line 62-65 to a disconnect position/terminal 92-95 (e.g., an open circuit, not connected to the converter 36 or either of the power lines 50, 52). The controller/sensor 46 can include one or more processors (and may share a processor) that can read and execute software code instructions, stored in memory, to perform functions described herein. The converter 36 is connected to the DC disconnect switch 34 and configured to convert DC energy received from the solar panels 16 to AC energy in accordance with a signal received from the power grid sensor 46. The converter 36 is configured to operate as either a current source inverter (CSI) in a CSI mode or a voltage source inverter (VSI) in a VSI mode in accordance with whether the grid sensor 46 provides a CSI or a VSI signal, respectively. The sensor 46 will cause the converter 36 to operate in CSI mode if a power grid with acceptable power is connected, and will cause the converter 36 to operate in VSI mode if no grid with acceptable power is connected. The VSI mode can be used during short or long durations of lack of acceptable power grid power, and even in cases where no power grid is connected at all. The converter 36 has its neutral line connected to the line 54 in the electric panel 26 that is connected to the neutral line of the power grid 14. A first (e.g., 0° electrical phase) line 82 of the converter 36 is connected to one contact of the switch 40 and to the switches 42, 44, and a second line 84 (e.g., 180° electrical phase) is connected to the other contact of the switch 40 and to the switches 43, 45. The switches 42-45 are configured to selectively couple either the power lines 50, 52 from the power grid 14 (via the circuit breaker 72-75) or the power lines 82, 84 from the converter 36 (via the fuses 48) to the AC load lines 62-65 connected to AC loads within the house 12. The switch 40 is configured to selectively couple or decouple the power lines 82, 84 from the converter 36 to the power lines 50, 52 connected to the power grid 14 (via the circuit breakers 76, 77). In the CSI mode, the converter 36 provides as much current as is available from the energy received from the solar panels 16 and provides the current, with a voltage dictated by the power grid voltage to the power lines 50, 52, and optionally 54. In the VSI mode, the converter 36 is configured to provide a predetermined voltage such as 120 volts from line to neutral, i.e., from line 82 or 84 to the neutral 54, and 240 volts from line to line, i.e., from line 82 to line 84, to imitate the power grid 14 or otherwise appear as a substitute for the power grid 14. To properly imitate the power grid 14 in VSI mode, the voltage on the neutral line 54 is regulated to be approximately at a midpoint between the output voltages 82 and 84 of the DC-AC converter 36. The input voltage to the converter 36 may come directly from the solar panels 16 or from the panels 16 via a DC-DC converter, which could be part of the converter 36 itself. The regulation can be done by passive means (e.g., a large split-capacitor bank) or by active means. The circuitry regulating the neutral line voltage can be part of the converter 36 or a separate unit in the module 24.

The controller/power grid sensor 46 is configured to determine whether the power grid 14 is within power specifications, to control the switch 40, and to provide the CSI/VSI signal to the converter 36 accordingly. The controller/sensor 46 is connected, via the circuit breakers 76, 77, to the power lines 50, 52 connected to the power grid 14. This sensor 46 is configured to sense the power provided by the power grid 14. The controller/sensor 46 is further configured to determine whether the power provided by the power grid 14 is within desired specifications (e.g., within acceptable ranges of voltage and frequency such as those provided in IEEE 1547 or UL 1741) or is out of specification, e.g., during a brownout or blackout. The controller/sensor 46 is further configured to determine whether the module 24 is unintentionally islanding, and thus creating possible safety hazards (e.g., see U.S. Pat. No. 7,015,597 for techniques for determining unintentional islanding). The controller/sensor 46 is further configured and coupled to the switch 40 to control whether the switch 40 is open or closed. The controller/sensor 46 is configured such that if the power from the power grid is within the specifications, the sensor 46 will control the switch 40 to be closed thereby connecting the converter 36 to the power lines 50, 52 and will send the CSI/VSI signal to the converter 36 indicating for the converter 36 to operate in the CSI mode. The controller/sensor 46 is configured such that if the power from the power grid 14 is out of specification, then the switch 40 will be open and the sensor 46 will send the CSI/VSI signal to the converter 36 indicating for the converter 36 to operate in the VSI mode. The controller/sensor 46 is further coupled and configured to control the switches 42-45 such that if the power grid 14 is within specification, then the switches 42-45 connect the lines 50, 52 to the AC load lines 62-65, and if the power grid 14 is out of specification, then the switches 42-45 connect the converter 36 to the AC load lines 62-65.

The controller 46 is configured to regulate the switches 42-45 to accommodate different load priorities. The controller 46 is configured to control the state of the switches 42-45 depending on the mode of the converter 36 (i.e., the state of the power grid, in or out of specification, as indicated by the power grid sensor 46). The controller 46 is further coupled to the AC load lines 62-65 and is further configured to control the state of switches 42-45 dependent on power available from the converter 36 from the solar panels 16, amounts of power desired by AC loads connected to the AC load lines 62-65, and priorities associated with the AC loads. The controller 46 has stored within it priorities associated with loads connected to the lines 62-65. The controller 46 is programmable, e.g., by a user, to store the priorities based on various criteria, e.g., the existence or absence of closed-loops controller in the loads associated with the lines 62-65. The controller 46 can be programmed by receiving indications of loads in response to which the controller 46 can assign a priority. The controller 46 can assign a higher priority to a load that does not have a closed-loop controller (e.g., a garage door opener) and assign a lower priority to a load that has a closed-loop controller (e.g., a refrigerator, or a furnace). The controller 46 can monitor power being provided to the loads via the lines 62-65, and compare the power being provided with the priorities associated with the lines 62-65 and desired powers associated with those lines 62-65, which are also stored in the controller 46. The controller 46 can determine whether more power is desired to be provided to a higher-priority load than is currently being provided while power is available on a line connected to a lower-priority load. Higher-priority loads are typically loads that are not delayable or do not have their own controllers (e.g., lights, garage door openers) while lower-priority loads are typically delayable and/or have their own controllers (e.g., heaters, refrigerators) and can thus compensate for temporary denial of power. The controller 46 can control the appropriate switches 42-45 to open the connections between the converter 36 and the lower-priority switch(es) 42-45 to maintain power availability for the higher-priority load(s). The controller 46 will cause lower-switch(es) 42-45 to connect the load line(s) 62-65 to the disconnect terminal(s) 92-95. This will provide an open circuit between the converter 36 and the load line(s) 62-65 whose corresponding switch(es) 42-45 is(are) in the disconnect position and provide an open circuit between the power grid lines 50, 52 and the corresponding load line(s) 62-65 so that neither the converter 36 nor the power grid lines 50, 52 are connected to the corresponding load line(s) 62-65. An example of such a configuration is described in pending U.S. patent application Ser. No. 10/952,565. Preferably, the controller 46 will only cause one or more of the switches 42-45 to be opened if the loads are trying to draw more power on the lines 62-65 than is currently available form by the converter 36 and the solar panels 16. The controller 46 thus provides intelligent load management for powering the AC loads.

Figure 4:
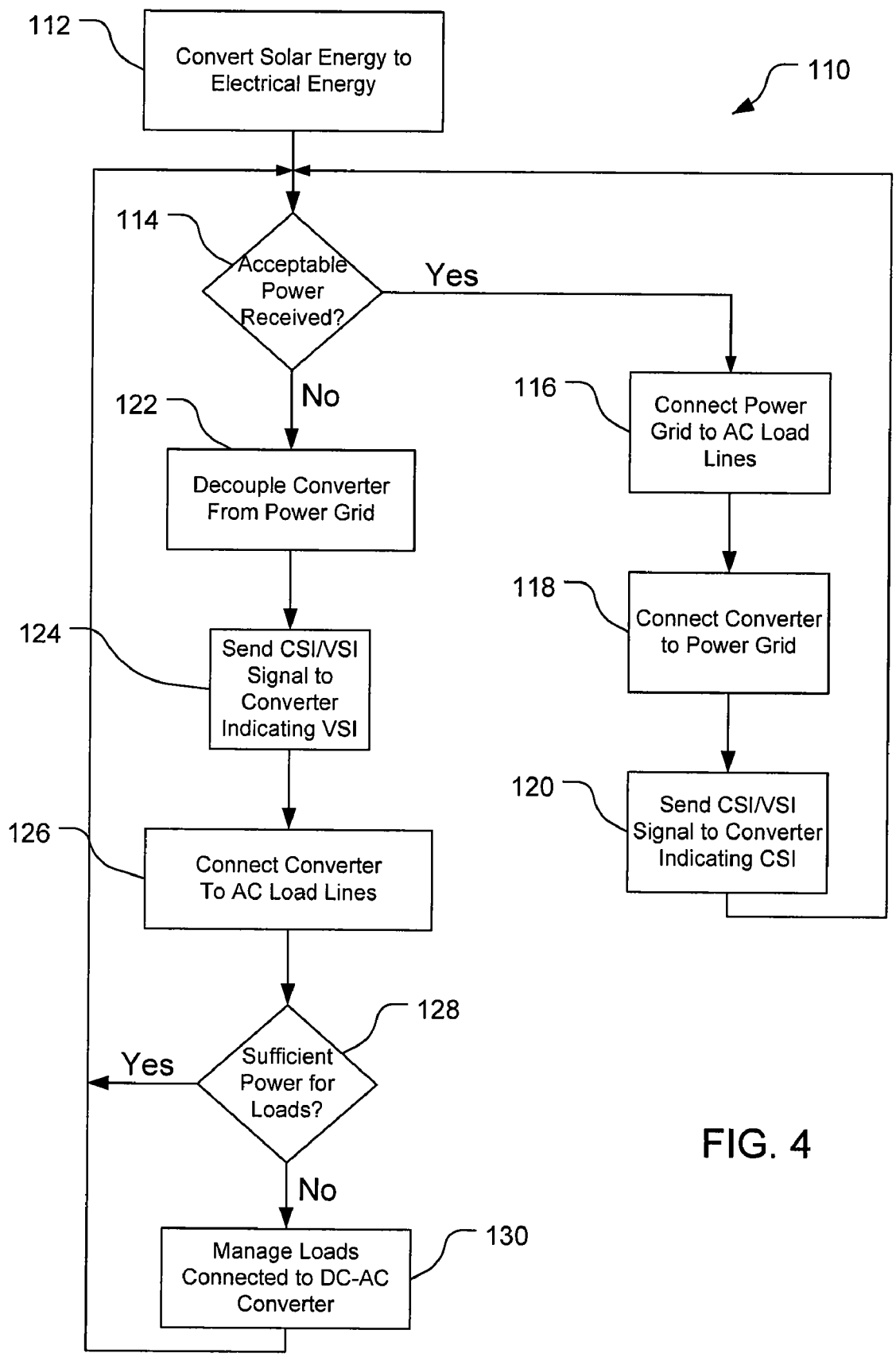
FIG. 4 is a block flow diagram of providing power in the arrangement shown in FIG. 1 using the system shown in FIGS. 2-3.

In operation, referring FIG. 4, with further reference to FIGS. 1-3, a process 110 for selectively providing energy from the solar panels 16 to the power grid 14 or the home loads using the system 20 includes the stages shown. The process 110, however, is exemplary only and not limiting. The process 110 may be altered, e.g., by having stages added, removed, or rearranged.

At stage 112, the solar panels 16 convert solar energy to electric energy. The electric energy is conveyed through the DC disconnect 20 to the module 24, and specifically to the DC-to-AC converter 36.

At stage 114, it is determined whether the power grid 14 is providing power within specification and whether the module 24 is unintentionally islanding. The power grid sensor 46 monitors the power on the lines 50, 52 from the power grid 14 via the circuit breakers 76, 77. The sensor 46 determines whether the power is within acceptable ranges of voltages and frequencies for the power grid 14. It is also determined whether a device appearing to be the power grid 14 is connected to the module 24. It is thus determined whether a power grid of acceptable power is connected to the module 24. If the sensor 46 determines that power within specification is not being received, then the process 110 proceeds to stage 122, and if the sensor 46 determines that power within specification is being received, then the process 110 proceeds to stage 116.

At stage 116, the power grid 14 is connected to the AC load lines 62-65. The controller/sensor 46 controls the switches 42-45 to connect the power grid lines 52-54 to the AC load lines 62-65.

At stage 118, the converter 36 is connected to the power grid 14. The controller/sensor 46 controls the switch 40 such that the switch 40 closes to couple the converter 36 to the power grid lines 50, 52. The converter 36 thus can provide power via the lines 82, 84 and the switch 40 to the power grid lines 50, 52.

At stage 120, the controller/sensor 46 sends the CSI/VSI signal to the converter 36 indicating that the power grid voltage is within acceptable ranges of voltages and frequencies. The CSI/VSI signal indicates to the converter 36 to operate in the CSI mode. This signal can thus be called a CSI signal. The converter 36 responds to the CSI signal to operate in the CSI mode to convert power from the solar panels 16 to AC power and provide the AC power to the power grid 14.

At stage 122, with the grid sensor 46 determining that the power grid 14 is not within specification, the converter 36 is decoupled from the power grid 14. The controller/sensor 46 controls the switch 40 to open the switch 40 to isolate the converter 36 from the power grid lines 50, 52.

At stage 124, the controller 46 indicates to the converter 36 to operate in VSI mode. The controller 46 sends the VSI signal to the converter 36 to operate in the VSI mode. This signal can thus be called a VSI signal.

At stage 126, the converter 36 responds to the VSI signal to operate in VSI mode and is connected to the AC loads. The controller 46 sends control signals to cause the switches 42-45 to connect the output lines 82, 84 of the converter 36 to the AC load lines 62-65, respectively. The power from the converter 36 at the pre-determined voltage (e.g., 120V) is provided from the converter 36 to the AC loads via the AC load lines 62-65. If current drawn exceeds an acceptable limit or threshold current (e.g., due to a fault in a load) at any of the switches 42-45, then the corresponding fuse 48 is blown thereby disconnecting the converter 36 from the corresponding AC load line 62-65.

At stage 128, the controller 46 determines whether sufficient power is available to power the AC loads. The controller 46 monitors the power available, which depends on the solar panels 16 and the converter 36, for the AC load lines 62-65 and compares this power availability with values stored in the controller 46 as to acceptable, desired power for each of the loads. If the controller 46 determines that sufficient power is available for the loads, then the process 110 returns to stage 114. If the controller 46 determines that less power is available than desired to fully operate the loads connected to the load lines 62-65, then the process 110 proceeds to stage 130.

At stage 130, the controller 46 manages how the available power is distributed to the loads. The controller 46 determines whether the power being provided to the highest-priority load is sufficient. If the highest-priority load is not being sufficiently powered, then the controller 46 causes the switches 42-45 corresponding to the lowest-priority load to be opened to disconnect the converter 36 from the lowest-priority load. This analysis continues with the next-lowest-priority load being disconnected until sufficient power is being provided to the highest-priority load. The controller 46 then determines if the next-highest-priority load is being sufficiently powered and disconnects the next-lowest-priority load from the converter 36 if it is not being sufficiently being powered. This continues until all of the connected loads are being sufficiently powered. The process 110 returns to stage 114 to determine again whether the power grid 14 is now providing voltage within the acceptable ranges of voltages and frequencies. If the voltage and frequency from the power grid 14 returns or becomes within the acceptable ranges, then the process 110 proceeds to 116 and the connection of the converter 36 to the AC load lines 62-65 is terminated and regulation of the switches 42-45 is not performed.

Figure 5:
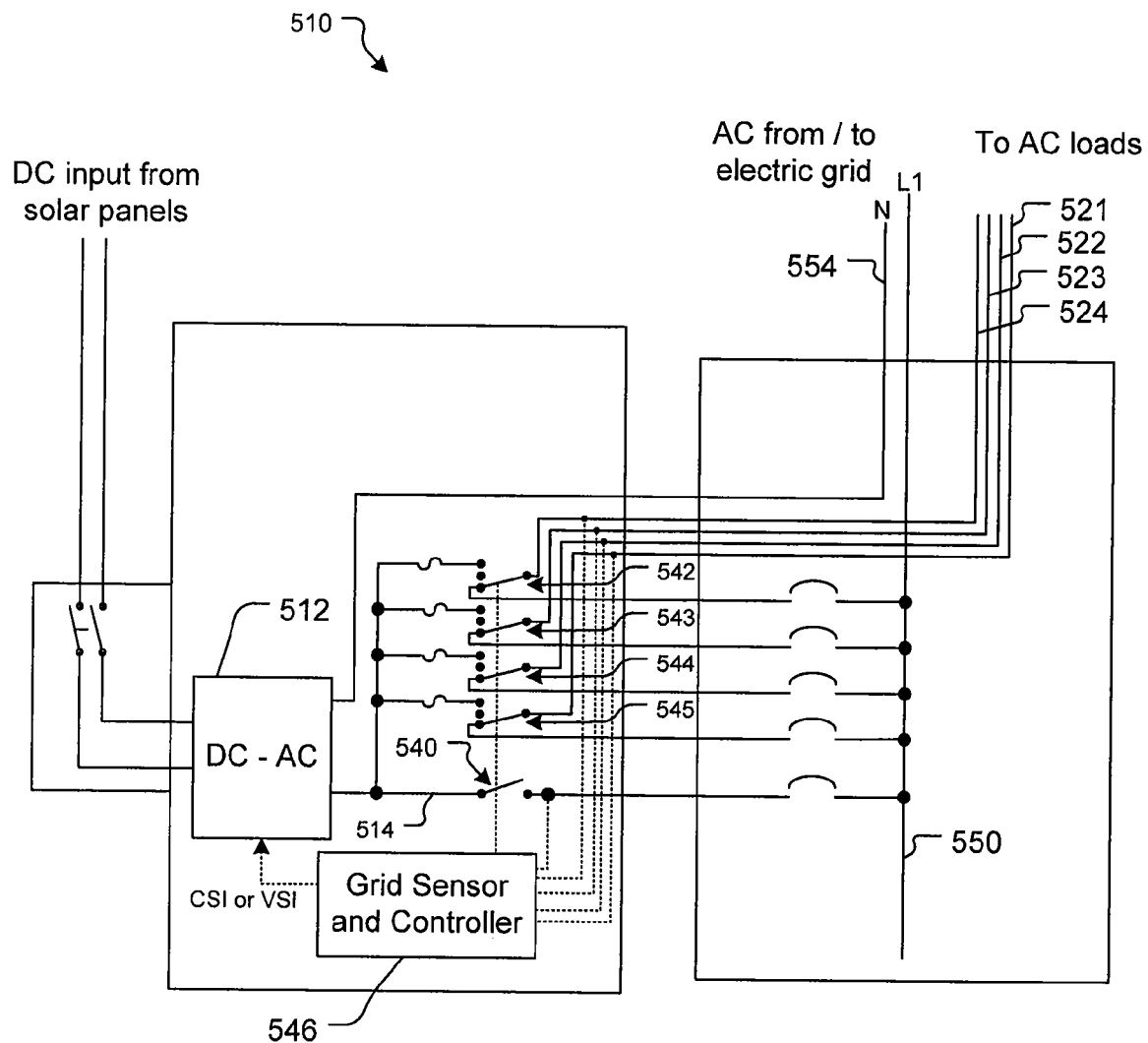
FIG. 5 is a block diagram of a single-phase grid-tied photovoltaic converter system.

Other embodiments are within the scope of the description and claims. For example, different power grid arrangements may be accommodated. For example, while the system 20 shown in FIG. 3 is for use with a split-phase power grid, referring to FIG. 5, a single-phase energy distribution system 510 may be used with a single-phase AC power grid. As with the converter 36 in FIG. 3, a DC-AC converter 512 is configured to operate as either a current source inverter (CSI) in a CSI mode or a voltage source inverter (VSI) in a VSI mode in accordance with whether a grid sensor 546 provides a CSI or a VSI signal, respectively. In the system 510, the DC-AC converter 512 has its neutral line connected to a line 554 that is connected to the neutral line of the power grid. The converter 512 has its output line 514 connected to a switch 540 and to switches 542-545. The switches 542-545 are configured to selectively couple either a power line 550 from the power grid or the output line 514 of the converter 512 to AC load lines 521-524. The switch 540 is configured to selectively couple/decouple the output line 514 of the converter 512 to/from the power line 550 connected to the power grid. In the CSI mode, the converter 512 preferably provides as much current as is available from the energy received from the solar panels and provides the current, with a voltage dictated by the power grid voltage, to the power line 550. In the VSI mode, the converter 512 provides a predetermined voltage, such as 230 volts from line to neutral, to imitate the power grid or otherwise appear as a substitute for the power grid. As with the sensor/controller 46 of FIG. 3, the controller/power grid sensor 546 is configured to determine whether the power grid is within specifications, to control the switch 540, and to provide the CSI/VSI signal to the converter 512 accordingly. Also similar to the sensor/controller 46, the controller 546 is further coupled and configured to control the switches 542-545, depending on the status of the power grid and depending on the availability of power from the solar panels versus the priority of the AC loads 521-524.

Figure 6:
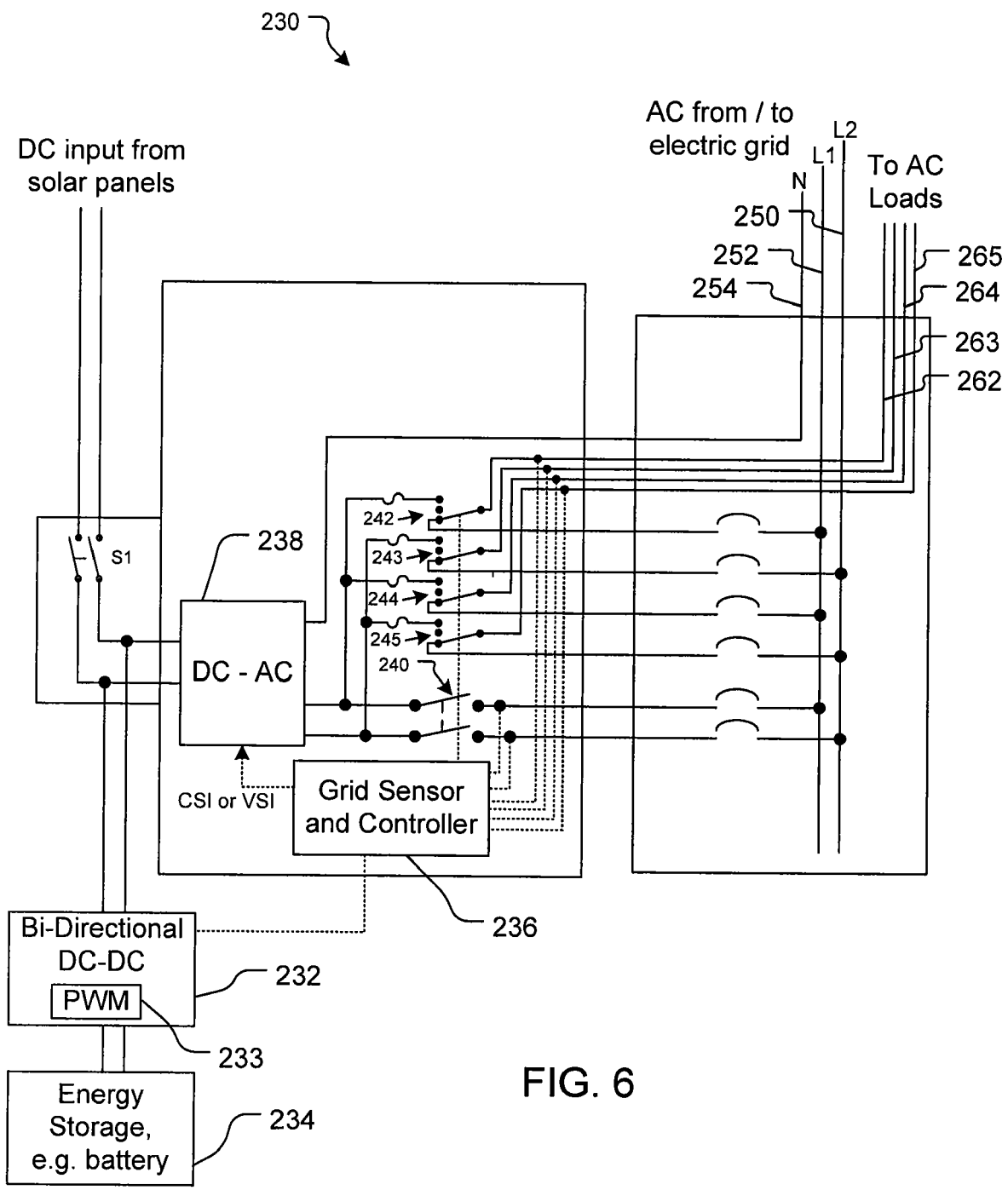
FIG. 6 is a block diagram of a split-phase grid-tied photovoltaic converter system with a back-up energy storage device.

Further, an energy storage backup may be used. Referring to FIG. 6, an energy distribution system 230 includes a bidirectional DC-DC converter 232, an energy storage device 234, here a battery, and a controller 236. The bidirectional converter 232 is configured to convert power to the appropriate DC voltage to transfer energy from the solar panels to the battery 234 or from the battery 234 to the converter 238. The bidirectional converter 232 is coupled to the controller 236 and controlled by the controller 236 to provide power from the battery 234 to the DC-AC converter 238 if the power grid is out of specification and the solar panels are providing less power, as converted by the DC-AC converter 238, than is desired by the AC loads. The converter 232 is further controlled by the controller 236 to provide power from the solar panels to the battery 234 to charge the battery 234 if the power grid is out of specification and the solar panels are providing more power, as converted by the DC-AC converter 238, than is desired by the AC loads. The controller 236 is further configured to regulate distribution of power to the AC loads to maintain power availability for power the loads, as described above. The converter 232 may have its own processor, independent of the processor in the controller 236.

Figure 7:
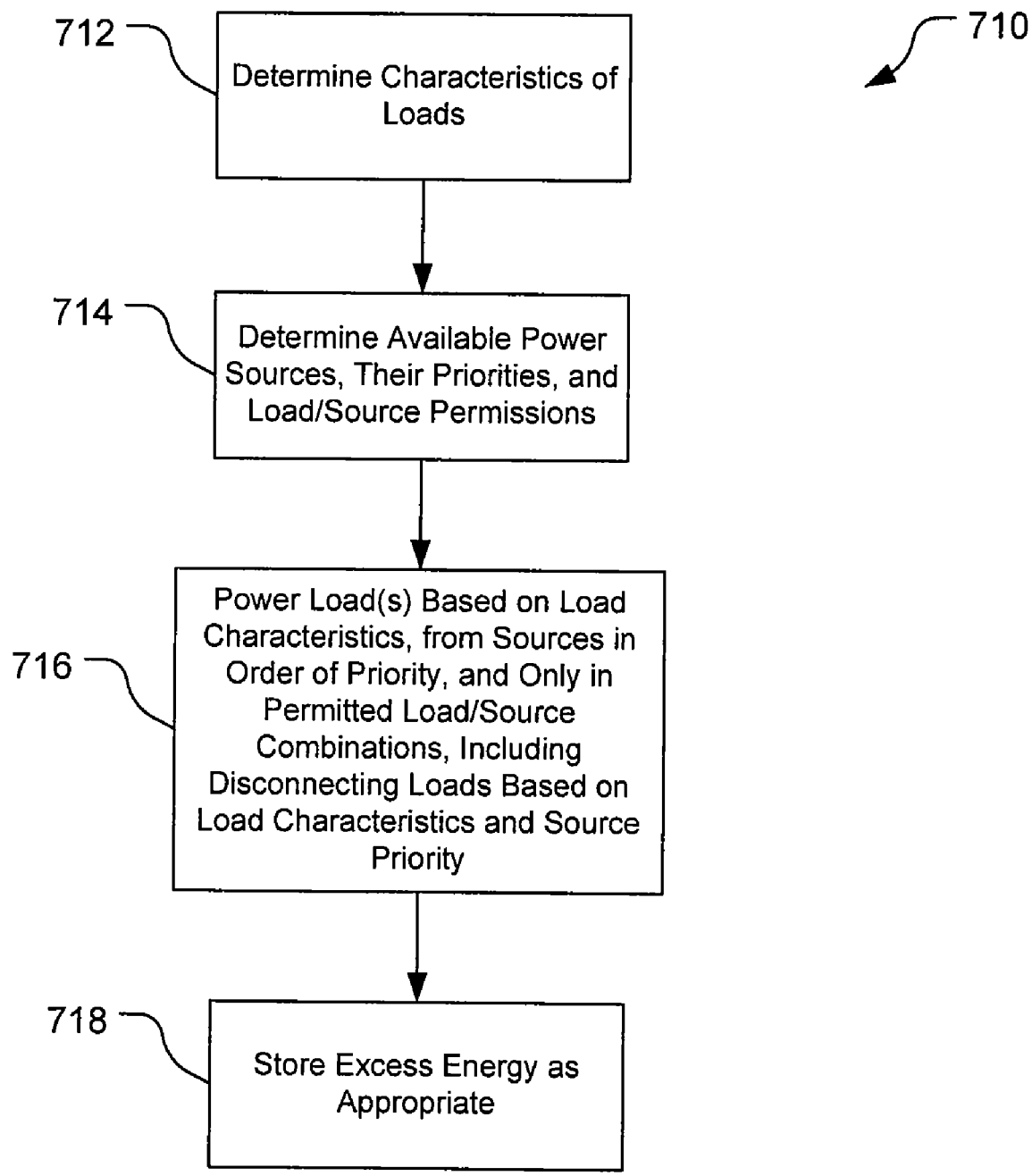
FIG. 7 is a block flow diagram of portions of the flow diagram shown in FIG. 4.

In operation, referring to FIG. 7, with further reference to FIGS. 1-4 and 6, a process 710 for determining which loads to connect/disconnect for/from receiving power, and connecting/disconnecting the appropriate loads, e.g., stages 126, 128, 130 of FIG. 4, using the system 20 or the system 230, as appropriate, includes the stages shown. The process 710, however, is exemplary only and not limiting. The process 710 may be altered, e.g., by having stages added, removed, or rearranged. Also, while the description below refers to solar power, the process 710 is equally applicable to use with other sources of power, particularly other renewable energy sources (e.g., wind, geothermal, water, biofuel, anaerobic digestions, etc.).

At stage 712, one or more characteristics of the AC loads are determined. The characteristics are preferably in addition to the load (power draw) of each of the AC loads. For example, the controller 46 determines the delayability of each the AC loads. This determination can take a variety of forms, such as a user programming the controller 46.

At stage 714, the available power sources, their priorities, and source/load permissions are determined. For example, the controller 46 determines the existence of the solar panels 16 and the energy storage device 234. The controller 46 also determines the priority of desired order of use of the sources. Further, the controller 46 determines the permissible combinations of loads and sources. These determinations may be made in a variety of manners, such as by programming the controller 46. Some loads may be only permitted to use energy derived from some sources (e.g., a garage door opener may be permitted to use solar power but not battery power, while a refrigerator could use any available power source). Also, source/load permissions may change, e.g, as a function of time (e.g., a microwave oven may be permitted to be connected to the DC-to-AC converter during the day, but not at night). As a further example, a particular load may only be permitted to be coupled to the power grid, an alternative AC power source (if alternative load switches are used (see FIG. 9)), or a particular type of DC source, e.g., solar panels but not an energy storage device (e.g., battery).

At stage 716, one or more of the AC loads is powered based on characteristics of the loads, available power, priority of the sources, and the permitted load/source combinations. The controller 46 attempts to power the loads based on their characteristics. For example, the controller 46 attempts to power all the non-delayable AC loads before attempting to power any of the delayable loads. The loads may be prioritized within the categories of delayable and nondelayable. Further, these categories are exemplary of characteristics that can be used, and not exhaustive. If there is sufficient power available from the source or sources permitted to power a particular load that the controller authorizes to receive power, then the controller 46 powers the particular load using the fewest number of the permitted sources, in order of priority. Further, if the power draw of loads presently connected exceeds the available power (e.g., available power declined and/or drawn power increased), then the controller disconnects one or more loads based upon their characteristics and the source priority until the available power meets or exceeds the drawn power. Before connecting a particular load to a particular power source, or deciding whether to disconnect a particular load from a particular source, an inquiry can be made as to whether this coupling is permitted, with the coupling made/continued if permitted and not made/broken if not permitted.

At stage 718, excess energy is stored. If the sources are capable of providing more power than presently drawn by all the AC loads, then excess power is provided to the energy storage device 234, if present, particularly energy from a renewable energy source, e.g., the solar panels 16.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, one or more of the fuses 48 may be replaced by circuit breakers. Also, while monitoring of whether power grid voltage is within specification was described sequentially (e.g., stage 114 after stage 120 or 130), this may be done in parallel intermittently, periodically, or continuously (e.g., stage 114 in parallel with higher-numbered stages in FIG. 4). Also, while the term "switch" has been used, this term is not limiting and includes various forms of controllable selective couplers.

The controller may be configured to regulate the power availability to the AC loads based on other factors than those described and/or during times when the grid power is within specification. For example, the controller could receive a signal (e.g., from a power company supplying the grid power) to control management of the load switches to switch off air conditioning, or other items, during peak times. As another example, the controller could control the load switches to manage power availability dependent on the time of day (e.g., peak vs. off-peak) to manage power draw from the grid, e.g., based on the present rate for power.

Figure 8:
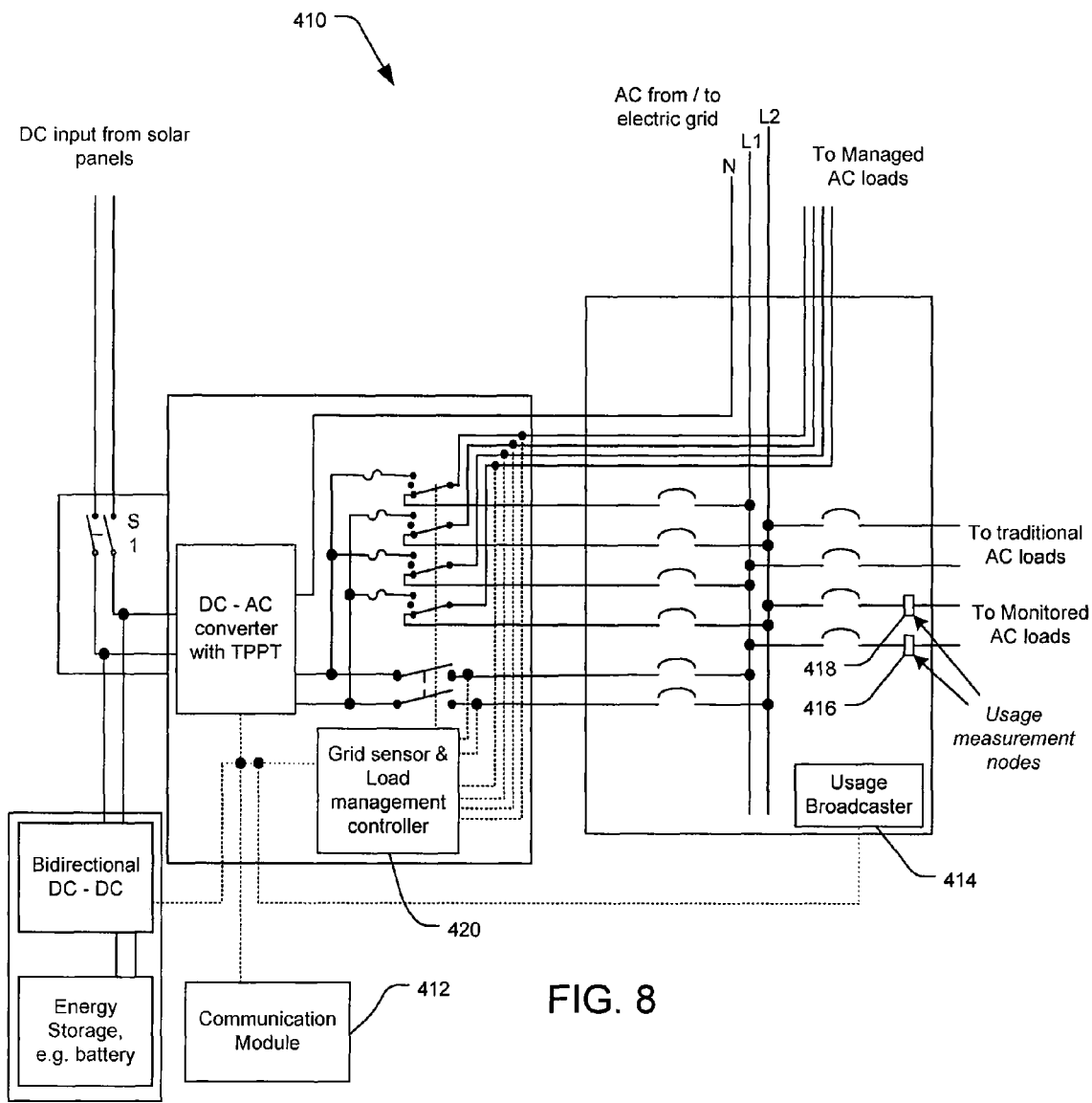
FIG. 8 is a block diagram of another grid-tied photovoltaic converter system.

Other embodiments are within the scope of the description and claims. For example, referring to FIG. 8, an energy distribution system 410 includes a communication module 412, a usage broadcaster 414, measurement nodes 416, 418, and a grid sensor and load management controller 420. The nodes 416, 418 are configured and connected to measure/monitor lines connected to loads such that the loads are monitored loads. The nodes 416, 418 and the broadcaster 414 are preferably configured to wirelessly communicate (e.g., using radio frequency (RF) signals, ZigBee signals, etc.) such that the usage broadcaster 414 can receive information from the nodes 416, 418 regarding the energy delivered to the monitored loads. Alternatively, the nodes 416, 418 can communicate with the broadcaster 414 through one or more wired connections. The nodes 416, 418 can be of various forms, e.g., clamp-on monitors, feed-through monitors, "smart breakers," etc. For example, clamp-on monitors could be used for feeds from a utility to a user's main panel. The broadcaster 414 is preferably wired to the sensor/controller 420 and the communication module 412 and configured to send information, e.g., digitally, to the controller 420 and the module 412. The communication module 412, e.g., a wireless card, is preferably configured to wirelessly communicate with remotely-located devices to provide information regarding the system 410, although a wired communication connection may be used. The system 410 can be remotely monitored by receiving information from the module 412 and remotely managed by providing commands to the controller 420 through the module 412. For example, a user such as an end-user/homeowner, an installer/warranty provider, a third-party owner-operator, a utility company, a third-party "aggregator" selling information to a utility company, etc. can monitor the system 410. The user can manage loads for energy efficiency, e.g., controlling an electric water heater as though the heater had a programmable thermostat. A graphical user interface (GUI) can be provided to the user via the communication module 412, e.g., at a web page, to show the energy usage, renewable energy production, etc. by the system 410. A remote terminal (e.g., physically similar to a programmable thermostat) could be provided to a user to show the energy usage, renewable energy production, etc. by the system 410. Information regarding the system 410 can be provided in various forms, e.g., as a percent of optimal operation, as scientific units (e.g., "The system produced 13.4 kWh today."), etc. A user can also be informed of environmental benefits of the system 410 (e.g., "The system saved X grams of $CO_2$ today.").

Still other embodiments are within the scope of the description and claims. For example, while the description above discussed connecting delayable loads based upon available power and power used by the loads, other factors may be used, alone or in combination, at stages 316, 334 to determine which delayable loads to power that may result in different usage of available power, e.g., not maximizing the amount of available power used. For example, delayable loads may have priorities associated with them, maximum off times, and/or minimum on times, etc. Thus, using the example of non-delayable loads of Load1 of 10 W, Load2 of 20 W (with Load1 having higher priority than Load2), and delayable loads Load3 of 30 W, and Load4 of 40 W, with 72 W of solar power available, Load1, Load2, and Load4 are initially connected, maximizing utilization of the available power (using 70 of 72 W available watts). If Load3 has a maximum off time of 45 minutes and a minimum on time of 10 minutes, then these times may override the power use maximization at stages 316, 334. After 45 minutes of Load1, Load2, and Load4 being connected (70 W total), the controller 236 will disconnect Load4 and connect Load3 in order to comply with Load3's maximum off time, despite the aggregate load being only 60 W of 72 W available. The controller 236 will keep Load3 connected for its 10 minute minimum on time, then revert to maximizing the total load by disconnecting Load3 and connecting Load4 (restoring 70 W load). If priorities were assigned to delayable loads, these could also override maximization of delivered power. For example, if Load3 had a higher priority than Load4, then the controller 46 would connect Load1, Load2, and Load3 for a 60 W aggregate, despite the 70 W combination of Load1, Load2, and Load4 being higher.

Figure 9A:
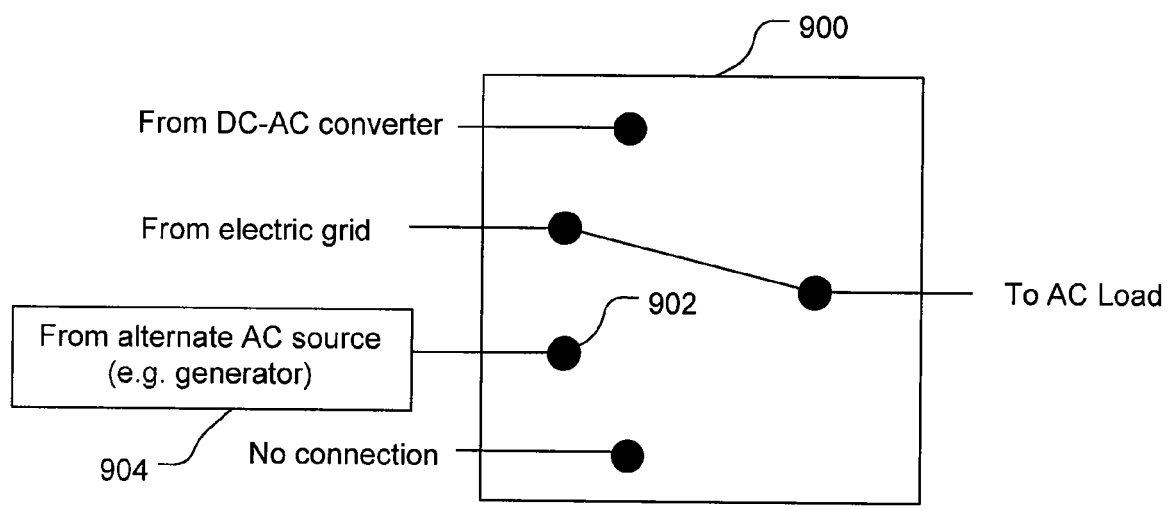
FIG. 9A is a block diagram of an alternative load switch.
Figure 9B:
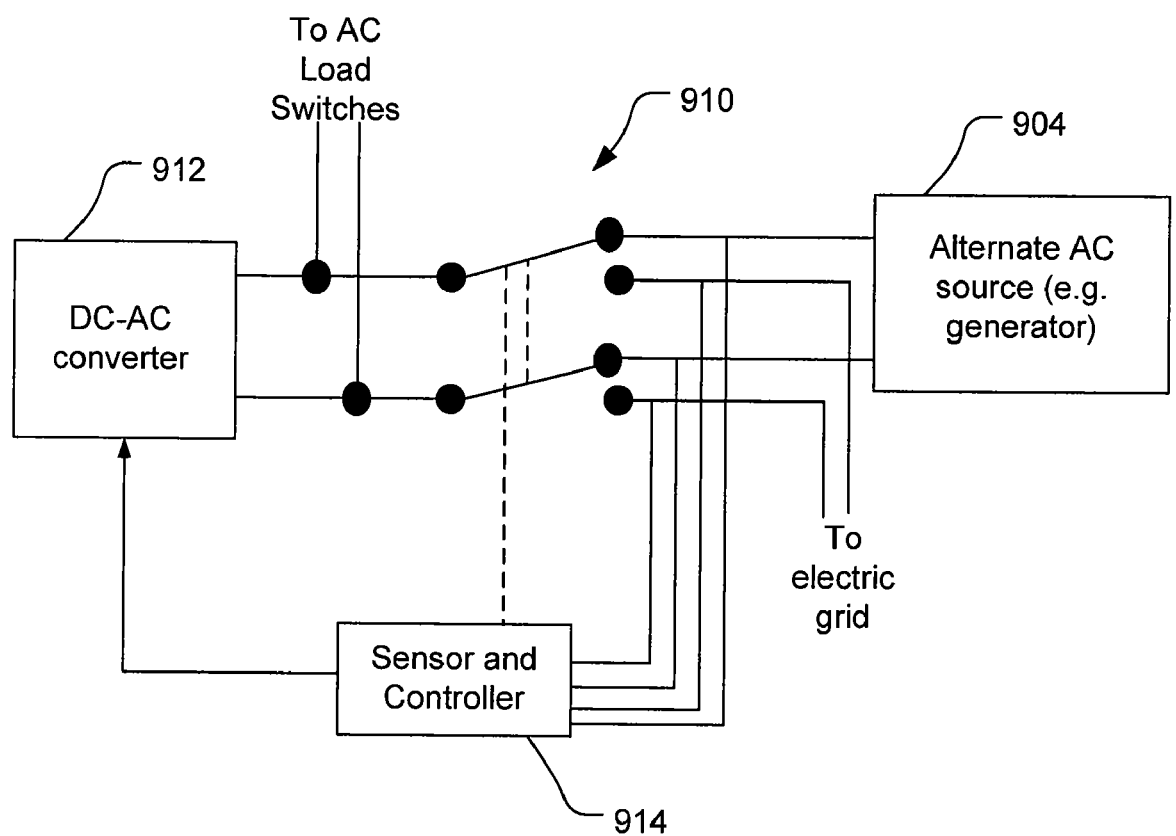
FIG. 9B is a block diagram of a power switch, AC generator, and DC-to-AC converter for use in a power delivery system.

Still other embodiments are within the scope of the description and claims. For example, an auxiliary energy source could take forms other than an energy storage device and a DC-DC converter, such as a DC-output generator. Further still, the load switches may have other configurations. For example, as shown in FIG. 9, an alternative load switch 900, for use in systems disclosed herein, has four selectable terminals where a fourth terminal 902 is connected to an AC source 904 other than the grid, such as an AC generator. A load switch 900 is preferably provided for each AC load. Also, other configurations of a power switch are possible. As shown in FIG. 9B, a power switch 910 can couple either the electric grid or the AC generator 904 to the AC load switches. The power from the AC generator 904 may be combined with AC power from the DC-AC converter and provided to the AC load switches. A sensor and controller 914 is connected and configured to sense power from the grid and the AC generator 904, control the state of the switch 910, and control the mode of the DC-AC converter 912. If the sensor/controller 914 determines that an electric grid with acceptable AC power available is connected to the switch 910, then the controller 914 activates the switch 910 such that the DC-AC converter 912 is connected to the grid and sends a CSI signal to the DC-AC converter 912 to cause the converter 912 to operate in CSI mode. If the sensor/controller 914 determines that there is no electric grid with acceptable AC power available connected to the switch 910 and the AC generator 904 is providing acceptable power, then the controller 914 activates the switch 910 such that the AC generator 904 is connected to the DC-AC converter 912 and sends the CSI signal to the converter 912. If the sensor/controller 914 determines that there is no electric grid with acceptable AC power available connected to the switch 910 and the AC generator 904 is not providing acceptable power, then the controller 914 activates the switch 910 such that the DC-AC converter 912 is isolated from both the electric grid and the generator 904 and sends a VSI signal to the converter 912. Further still, DC input power may be received from sources other than solar panels, such as from sources providing electrical energy derived from wind, geothermal sources, water (e.g., dams, tidal, wave), anaerobic digestion, and/or biofuels, etc.

Figure 10:
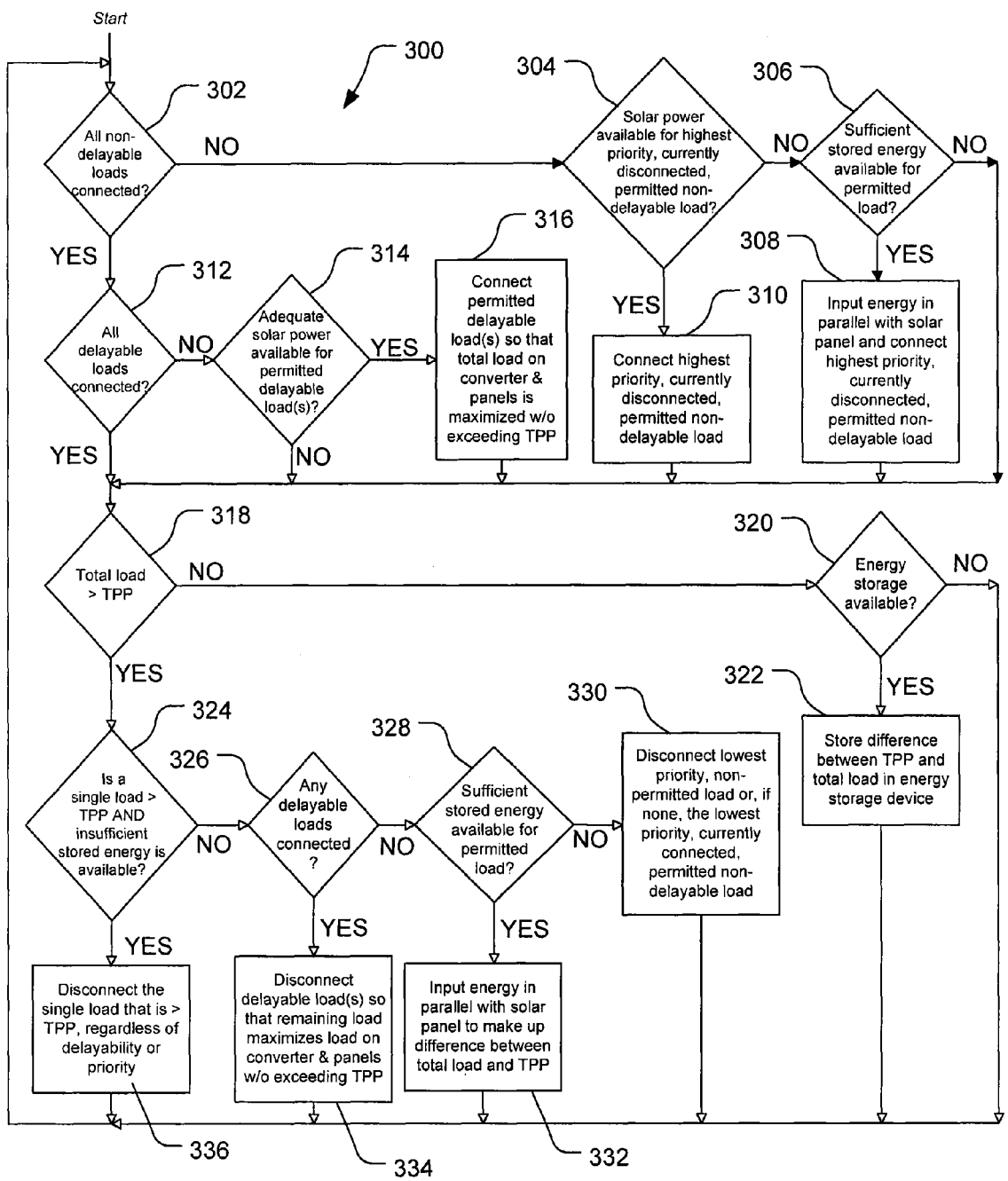
FIG. 10 is a block flow diagram of portions of the flow diagram shown in FIG. 4.

In operation, referring to FIG. 10, with further reference to FIGS. 1-4 and 6, a process 300 includes the stages shown. The process 300 is an exemplary embodiment of portions of the process 710 shown in FIG. 7. In the process 300, delayable loads are not permitted to be powered from an energy storage device. The process 300 provides for controlling what load connections to make or break depending upon load amounts, available power, and energy storage capacity. Stages 302, 304, 306, 308, 310, 312, 314, 316 address attempting to power more loads, stages 318, 320, 322 address handling of excess power, and stages 318, 324, 326, 328, 330, 332, 334, 336 address management of connections when the load exceeds power available. The process 300, however, is exemplary only and not limiting. The process 300 may be altered, e.g., by having stages added, removed, or rearranged. For example, stages 306, 308, 320, 322, 328, 332 are preferably omitted for systems such as the system 20 that do not have energy storage devices, but are preferably included for systems such as the system 230 that include energy storage devices.

At stage 302, an inquiry is made regarding which non-delayable loads are connected. The controller 46, 236 determines whether all non-delayable loads are connected to the DC-AC converter 36, 238 to receive energy from the solar panels 16. If all of the non-delayable loads are so connected, then the process 300 proceeds to stage 312 described below, and otherwise proceeds to stage 304.

At stage 304, with less than all non-delayable loads connected to the converter 36, an inquiry is made regarding the amount of available energy from the solar panels 16. The controller 46, 236 determines whether sufficient solar power is available for the highest priority, currently disconnected, non-delayable load permitted to be connected to receive solar power. If sufficient energy is available from the solar panels 16 for a permitted load, then the process 300 proceeds to stage 310 described below, and otherwise proceeds to stage 306.

At stage 306, with insufficient energy from the solar panels 16 available for the highest priority, currently disconnected, non-delayable load permitted to receive solar power, or for the highest priority, currently disconnected, non-delayable load not permitted to receive solar power, an inquiry is made as to whether there is sufficient stored energy available for the highest priority, currently disconnected, non-delayable load permitted to receive power from stored energy. The controller 46, 236 determines whether an energy storage device exists and has sufficient energy stores, when combined with the available solar energy, for powering the highest priority load that is currently disconnected, is non-delayable, and is permitted to be connected to receive power from the energy storage device. If sufficient stored energy is not available and/or no such permitted load exists, then the process 300 proceeds to stage 318 described below, and otherwise proceeds to stage 308.

At stage 308, stored energy is used to help power the highest priority non-delayable load allowed to receive power from an energy storage device. The controller 236 causes the appropriate switch of the switches 242-245 to connect the highest priority non-delayable load, that was previously disconnected, and that has permission to receive power from the energy storage device. The controller 236 further causes energy from the storage device 234 to be input via the DC-DC converter 232 in parallel with energy from the solar panels 16 to power the newly-connected load. The process 300 proceeds to stage 318 described below.

At stage 310, the highest priority, currently disconnected, non-delayable load allowed to solar power is connected to receive energy from the solar panels 16. The controller 46, 236 actuates the appropriate switch of the switches 42-45, 242-245 to connect the currently disconnected, highest priority non-delayable load, with appropriate permission, to receive energy from the solar panels 16, the controller 46, 236 having determined that sufficient energy is available from the solar panels 16 for powering this load and that the load is appropriately cleared for such connection. The process 300 proceeds to stage 318 described below.

At stage 312, with the controller 46 having determined that all non-delayable loads are connected, an inquiry is made regarding the connectivity of delayble loads. The controller 46, 236 determines whether all delayable loads are currently connected to receive power. If so, then the process 300 proceeds to stage 318 described below, and otherwise proceeds to stage 314.

At stage 314, with less than all delayable loads connected to the converter 36, 238, an inquiry is made regarding whether sufficient solar power is available for a disconnected delayable load that is permitted to receive solar power. The controller 46, 236 determines whether sufficient additional solar power is available for a currently disconnected delayable load with clearance to receive solar power. If such power is not available from the solar panels 16 for a permitted load, then the process 300 proceeds to stage 318 described below, and otherwise proceeds to stage 316.

At stage 316, one or more of the delayable loads that are currently disconnected and permitted to receive solar power are connected to receive such solar power. The controller 46, 236 preferably connects and disconnects (as appropriate) the delayable load or loads so that a total load on the DC-AC converter 36, 238 and the solar panels 16 is maximized without exceeding a threshold power point (TPP, e.g., a maximum power point, MPP). Alternatively, criteria other than maximizing the total load within the TPP may be used to determine which load(s) to connect. The controller 46, 236 preferably determines which of the disconnected delayable loads with solar power receipt permission can be connected to receive such power such that the combined power drawn by the then-connected delayable loads will be the highest available load that is less than the TPP in aggregate, given the already-connected delayable and non-delayable loads. The process 300 proceeds to stage 318.

At stage 318, an inquiry is made regarding the total power drawn by the connected loads versus the TPP. The controller 46, 236 sums the power drawn by the various loads on the lines 62-65, 262-265 to determine the total power drawn by the loads presently. The controller 46, 236 can determine the TPP, or its equivalent, in many ways such as by monitoring the voltage from the solar panels to the converter 36, 238. The controller 46, 236 determines whether the present total load is greater than the TPP. If the present total load is greater than the TPP, then the process 300 proceeds to stage 324 described below, and otherwise (if the total load is less than or equal to the TPP), then the process 300 proceeds to stage 320.

At stage 320, with the total load being less than or equal to the TPP, an inquiry is made as to whether there is energy storage available. The controller 236 determines whether there is energy storage available by determining whether the energy storage device 234 is present, and if so, if it is full. If no energy storage is available, e.g., because there is either no storage device 234 or the energy storage device 234 is full, then the process 300 proceeds to stage 302 and otherwise proceeds to stage 322.

At stage 322, with it having been determined that energy storage is available, excess energy is stored in the energy storage device 234. The controller 236 sends control signals to the DC-DC converter 232 to adjust the amount of power drawn from the solar panels 16 into the DC-DC converter 232. For example, the controller 236 can cause a pulse width modulator in the DC-DC converter 232 to adjust its duty cycle to draw more power, causing more power to be sent to the energy storage device 234. The process 300 returns to the stage 302.

At stage 324, with the aggregate power drawn by the loads being greater than the TPP, an inquiry is made as to whether a single load is greater than the TPP and whether there is stored energy available. The controller 46, 236 determines if there is a single load whose power draw is greater than the TPP and no stored energy is available. If this is the case, then the process 300 proceeds to stage 336 described below, and otherwise proceeds to stage 326.

At stage 326, with a single load not exceeding the TPP and/or stored energy being available, an inquiry is made as to the connectivity of delayable loads. The controller 46, 236 determines whether any delayable loads are currently connected to the converter 36, 238. This inquiry is preferably made before an inquiry regarding availability of stored energy (see stage 328 described below), in order to shed delayable loads before using stored energy. If there are delayable loads currently connected, then the process 300 proceeds to stage 334 described below, and otherwise proceeds to stage 328.

At stage 328, with it having been determined that there are no delayable loads connected, an inquiry is made regarding available stored energy. The controller 236 determines whether there is sufficient stored energy available in the device 234, in conjunction with the energy from the solar panels 16, for powering the non-delayable loads permitted to receive power from stored energy, i.e., to at least make up the difference between the present load and the power available from the solar panels 16. If so, then the process 300 proceeds to stage 332 described below and otherwise proceeds to stage 330.

At stage 330, with no energy storage device being present or with the controller 236 having determined that there is insufficient stored energy available to be combined with the energy from the solar panels 16 to power all of the currently-connected non-delayable loads permitted to receive power from stored energy, the controller 46, 236 actuates the appropriate switch of the switches 42-45, 242-245 to disconnect the currently-connected, lowest priority, non-permitted non-delayable load or, if none, the lowest priority, currently-connected, permitted non-delayable load. The process 300 returns to stage 302.

At stage 332, stored energy is used to assist in powering the currently-connected loads. The controller 236 causes energy from the energy storage device 234 to be input in parallel with energy from the solar panels 16 to make up the difference between the total load and the TPP from the solar panels 16. For example, the controller 236 can regulate a pulse width modulator in the DC-DC converter 232 to draw the differential power from the energy storage device 234.

At stage 334, with the controller 46, 236 having determined that there are delayable loads connected for receiving power, one or more delayable loads is disconnected. The controller 46, 236 actuates one or more appropriate switches of the switches 42-45, 242-245 to disconnect and connect (as appropriate) one or more delayable loads so that the remaining combination of connected loads draws as much power as possible, given the power draws of the presently connected delayable loads, from the DC-AC converter 36, 238 without exceeding the TPP if possible. The process 300 returns to stage 302.

At stage 336, with the controller 46, 236 having determined that a single load exceeds the TPP and insufficient stored energy is available to power the single load when combined with the solar energy, the load exceeding the TPP is disconnected from the converter 36, 238. The controller 46, 236 actuates the appropriate switch from the switches 42-45, 242-245 to disconnect the single load whose power draw exceeds the TPP, regardless of the delayability or priority of this load. The process 300 returns to stage 302.

The process 300 repeats to continuously adjust the load connections in order to adjust which loads are connected based on the available power. The controller 46, 236 preferably causes all non-delayable loads to be powered if sufficient energy is available. Preferably, non-delayable loads are prioritized and powered in accordance with their priorities if insufficient energy is available to power all of the non-delayable loads, including energy from an energy storage device. The controller 46, 236 further preferably causes excess energy to be stored if an energy storage device is available and uses available stored energy to support non-delayable loads when insufficient energy is available from the solar panels 16. Further, the controller 46, 236 preferably maximizes the delayable load power draw within the bounds of available power, e.g., if insufficient energy is available to power all of the delayable loads.

Other embodiments of processes for determining which loads to connect to receive power, and connecting those loads to receive power, may be used. For example, in the process 300, stage 326 is performed before stage 328 in order to shed delayable load before using stored energy. The stage 328 inquiry, however, could be made before the stage 326 inquiry, e.g., if it is preferred to use stored energy before shedding delayable load. Further, in embodiments where no energy storage device is available, determinations of available stored energy, available energy storage, or existence of an energy storage device, may be omitted.

EXAMPLE 1

For this example, portions of the process 300 are explained for an exemplary embodiment of the system 20. In this example, there are four loads (Load1 with a load of 10 W, Load2 with a load of 20 W, Load3 with a load of 30 W, Load4 with a load of 40 W), two being non-delayable (Load1 being higher priority than Load2) and two being delayable, and there is no energy storage device. Further, the example begins at or near sunrise, such that there has been no solar energy for some time, but the solar panels 16 are beginning to receive solar energy. It is also assumed that the grid power is down and that each of the switches 42-45 are in the disconnect position, connecting the loads 62-65 to neither the power lines 50, 52 nor the DC-AC converter 36.

As solar energy comes available, the controller 46 monitors the solar energy relative to the load energy for the highest-priority non-delayable load until sufficient solar energy exists for powering this load. At stage 302, the controller 46 determines that all non-delayable loads are not connected, and thus the process 300 proceeds to stage 304. In stage 304, the controller 46 determines that insufficient solar energy exists, e.g., 8 W, for powering Load1, leading to stage 306 where the controller 46 determines that there is not sufficient stored energy, here 0 W, for powering Load1. The process 300 thus proceeds to stage 318. Here, there is no load and some minor amount of available power, e.g., 2 W, so the load is less than the TPP. The process 300 proceeds to stage 320 where the controller 46 determines that there is no energy storage available so the process 300 returns to stage 302. This flow continues until enough solar energy exists for powering the highest-priority non-delayable load.

Assuming the solar power available reaches 10+W, e.g., 11 W, Load1 is connected to receive the solar energy. Once this condition exists, the controller 46, at stage 310, causes the appropriate switch, e.g., the switch 42, to connect Load1 to the converter 36 to receive energy from the solar panels 16. At stage 318, the load is less than the TPP, but there is no energy storage, so the process 300 proceeds through stage 320 and returns to stage 302.

The previous flow through the process 300, namely stages 302, 304, 306, 318 320, 302 . . . recurs until sufficient energy is available for powering the next-highest-priority non-delayable load, here Load2. Assuming enough energy is eventually provided by the panels 16, e.g., 32 W, then the process 300 will proceed through stages 302, 304, 310 to connect Load2 to the converter 36. If further non-delayable loads existed, then the flows described above would repeat to connect those loads, assuming the panels 16 provided sufficient energy.

Once all the non-delayable loads are connected, the controller 46 determines whether sufficient power exists to connect delayable loads, and if so, does so. With all non-delayable loads connected to the converter 36, but no delayable loads connected to the converter 36, the process 300 moves from stage 302 to 312 and then stage 314. If solar energy exceeding 60 W (power for Load1+Load2+Load3 (the lowest-power-using delayable load)) is not available from the converter 36, then the process 300 proceeds to stages 318, 320, 302, 312 and returns to stage 314 until at least 60 W, e.g., 64 W, is available, at which point the process 300 proceeds to stage 316. At stage 316, the controller 46 determines that Load3 can be connected to the converter 36 without overloading the converter 36 to maximize the usage of the available energy. If 75 W were available, then the controller 46 would connect Load4 to the converter 36, and disconnect Load3 if presently connected. The controller 46 causes the appropriate load(s), here Load3 with 64 W total available, to be connected to the converter 36. The process 300 proceeds through stages 318, 320, 302, 312, 314 as long as less than all delayable loads are connected and the load does not exceed the TPP. The process 300 proceeds to connect Load4 when the total available power exceeds 100 W. Assuming all delayable loads are also connected to the converter 36 and the total load does not exceed the TPP, then the process 300 will loop through stages 302, 312, 318, 320, 302 . . . .

If at any point the total load exceeds the TPP, then the process 300 works to reduce the load. The total load may exceed the TPP as a result of the amount of solar energy available decreasing, e.g., due to cloud cover, sun setting, etc., and/or the desired load increasing (e.g., a load is turned on and/or increases its power demand, e.g., a user turns on a microwave, a refrigerator controller increases power usage, etc.). For example, if the TPP decreases from 64 W to 52 W, then at stage 318 controller 46 determines that the load exceeds the TPP, and the process 300 proceeds to stage 324. At stage 324, the controller 46 determines whether there is a single load that exceeds the available power, i.e., the TPP and any stored energy (an "impossible" load under the circumstances). If so, then the controller 46 disconnects the load from the converter 36 at stage 336 by putting the corresponding switch 42-45 to its disconnect position. Here, the total load exceeds the TPP, but a single load does not exceed the available power, and thus the controller 46 determines, at stage 326, that there is a delayable load, Load3, connected to the converter 36, and causes Load3 to be disconnected at stage 334. If the available power had decreased from 104 W (with all four loads connected) to 93 W, then the controller 46 would disconnect Load3 at stage 334 and leave Load4 connected to maximize the available power used. If the available power decreases further, e.g., from 52 W to 26 W, then the controller 46 will determine that the load exceeds the TPP (stage 318), that a single load is not responsible for the power deficiency (stage 324), that no delayable loads are connected (stage 326), that no stored energy is available (stage 328), and thus cause the lowest-priority currently-connected non-delayable load, here Load2, to be disconnected at stage 330 by moving the corresponding switch, here the switch 43, to its disconnect position. If available power drops below 10 W, then the controller 46 will also disconnect Load1 at stage 330. If the power increases again, e.g., cloud cover clears, then more loads can be connected as appropriate through stages 316, 310.

EXAMPLE 2

For this example, portions of the process 300 are explained for an exemplary embodiment of the system 230. In this example, there are four loads (Load1 with a load of 10 W, Load2 with a load of 20 W, Load3 with a load of 30 W, Load4 with a load of 40 W), two being non-delayable (Load1 being higher priority than Load2) and two being delayable, and an energy storage device, here a battery, 234. Further, the example begins at or near a loss of grid power, with the battery 234 fully charged and capable of providing 25 W, and the panels 16 receiving solar energy with 200 W of energy being available from the panels 16. Thus, each of the switches 242-245 are connecting their respective loads 262-265 to the respective power lines 250, 252, not to the converter 238. Referring to FIG. 4, the controller 236 determines at stage 114 that the power grid is out of spec. Thus, at stage 122, the controller decouples the converter 238 from the power grid by opening the switch 240, and at stage 124, sends the CSI/VSI signal to the converter 238 to enter VSI mode. At stages 126, 128, 130, as more fully illustrated and explained by the process 300 of FIG. 10, the controller 236 determines which loads to connect/disconnect for/from receiving power, and connects/disconnects the appropriate loads.

Referring to FIGS. 6 and 10, the controller 236 acts to connect loads to the converter 238 in accordance with their power draws and available power from the panels 16 and the battery 234. The controller determines at stage 302 that less than all, for now none, of the loads are connected to the converter 238, determines at stage 304 that sufficient solar power is available to power Load1, and causes the switch 262 to connect Load1 to the converter 238 at stage 310. The controller 236 determines at stage 318 that the total load of 10 W is less than the 200 W of TPP, and determines at stage 320 that there is no energy storage available because the battery 234 is full. The process 300 returns to stages 302 and the controller 236 determines at stage 304 that there is enough solar power for Load2 and connects Load2 to the converter 238 at stage 310. The process 300 flows through stages 318 and 320 again and returns to stage 302. At stage 302, the controller 236 determines that Load1 and Load2 are connected to the converter 238 and thus determines at stage 312 that less than all, here none, of the delayable loads Load3, Load4 are connected to the converter 238. The controller 236 determines at stage 314 that additional solar power is available for Load3 and Load4 (200 W−10 W−20 W>30 W+40 W) and connects Load3 and Load4 to the converter 238. With all the loads connected, the process 300 cycles through stages 302, 312, 318, 320 until a change in status occurs.

If the solar energy available decreases and/or the load increases such that the total load exceeds the TPP, then the controller 236 evaluates whether to disconnect any load(s) and if so, which load(s). For example, if the solar power available from the panels decreases below 100 W, e.g., to 78 W, then the controller 236 determines at stage 318 that the load exceeds the TPP, determines at stage 324 that a single load does not exceed the TPP, determines at stage 326 that delayable loads Load3, Load4 are connected, and disconnects Load3 from the converter 238 by moving the switch 244 to its disconnect position. If the available solar power drops to any power less than the non-delayable load total plus the currently-connected delayable load total, then the controller 236 re-determines which, if any, delayable loads to connect to the converter 238. If the power drops to, e.g., 63 W, then the controller 236 disconnects Load4 from the converter 238 by moving the switch 245 to its disconnect position and connects Load3 to the converter 238 by moving the switch 244 to connect the load line 264 to the converter 238. If the solar energy decreases below the non-delayable load total, then the controller 236 will attempt to power the non-delayable loads using the battery 234. For example, if the solar power decreases to 27 W, then the controller 236 will determine at stage 318 that the load exceeds the TPP, determine at stage 324 that a single load does not exceed the TPP, determine at stage 326 that no delayable loads are connected, determine at stage 328 that sufficient stored energy is available to supplement the solar energy to power the present total load (27 W+25 W>30 W), and connect the battery 234 in parallel with the panels 16 at stage 332. The controller 236 controls the duty cycle of the PWM 233 to send the desired amount of power to the converter 238 (e.g., 3 W positive, i.e., sourced from the converter 232). If the combined solar and stored energy decreases below the total non-delayable load, e.g., 28 W total, then the controller 236 disconnects, at stage 330, the lowest priority presently connected non-delayable load, here Load2. If the total solar power and stored energy drops below the last connected non-delayable load, e.g., drops to 6 W (6 W solar and 0 W battery), then the controller 236 determines at stage 318 that the load exceeds the TPP (10 W>4 W), determines at stage 324 that a single load exceeds the TPP and that insufficient stored energy is available to combine with the solar energy to power the load (2 W<6 W (i.e., 10 W-4 W)), and disconnects the single load at stage 336.

If the battery 234 has been depleted at least partially, then the controller 236 can charge the battery 234 if energy is available from the solar panels 16. If the solar energy available, e.g., 72 W, exceeds the power used by the connected loads, here 70 W (the two non-delayable loads, Load1 and Load2, plus the delayable load, Load4), then the controller 236 can determine at stage 320 that energy storage in the battery 234 is available and store the difference, here 2 W negative (i.e., pulled into the converter 232), between the TPP and the total load of the connected loads in the battery 234. The controller 236 can manage the amount of energy stored by controlling the duty cycle of the PWM 233 in the bidirectional DC-DC converter 232 to draw the appropriate amount of energy from the solar panels 16 while leaving sufficient energy to power the connected loads. The controller 236 may store slightly less than the difference between the TPP and the load to help ensure proper powering of the connected loads.

EXAMPLE 3

For this example, portions of the process 300 are explained for an exemplary embodiment of the system 230. In this example, there are four loads (Load1 with a load of 10 W, Load2 with a load of 20 W, Load3 with a load of 30 W, Load4 with a load of 40 W), two being non-delayable (Load1 being higher priority than Load2) and two being delayable, and an energy storage device, here a battery, 234. Further, the example begins at or near a loss of grid power, with the battery 234 fully charged and capable of providing 25 W, and the panels 16 receiving no solar energy and thus 0 W of energy being available from the panels 16. Thus, each of the switches 242-245 are connecting their respective loads 262-265 to the respective power lines 250, 252, not to the converter 238. Referring to FIG. 4, the controller 236 determines at stage 114 that the power grid is out of spec. Thus, at stage 122, the controller decouples the converter 238 from the power grid by opening the switch 240, and at stage 124, sends the CSI/VSI signal to the converter 238 to enter VSI mode. At stages 126, 128, 130, as more fully illustrated and explained by the process 300 of FIG. 10, the controller 236 determines which loads to connect/disconnect for/from receiving power, and connects/disconnects the appropriate loads.

Referring to FIGS. 6 and 10, the controller 236 can attempt to power non-delayable loads using the battery 234. The controller 236 determines at stage 302 that none of the non-delayable loads Load1, Load2 are connected to the converter 238, determines at stage 304 that solar power for the Load1 is not available, determines at stage 306 that sufficient stored energy in the battery 234 is available for powering Load1, and provides the power from the battery 234 to power Load1 by controlling the PWM 233 to draw 10 W from the battery 234. Similarly, the controller 236 could power Load2 if the battery had at least 30 W of power available. Here, however, the controller 236 determines at stage 306 that the battery 234 has insufficient energy to power the highest priority presently disconnected non-delayable load, i.e., Load2 (25 W<10 W+20 W).

Figure 11:
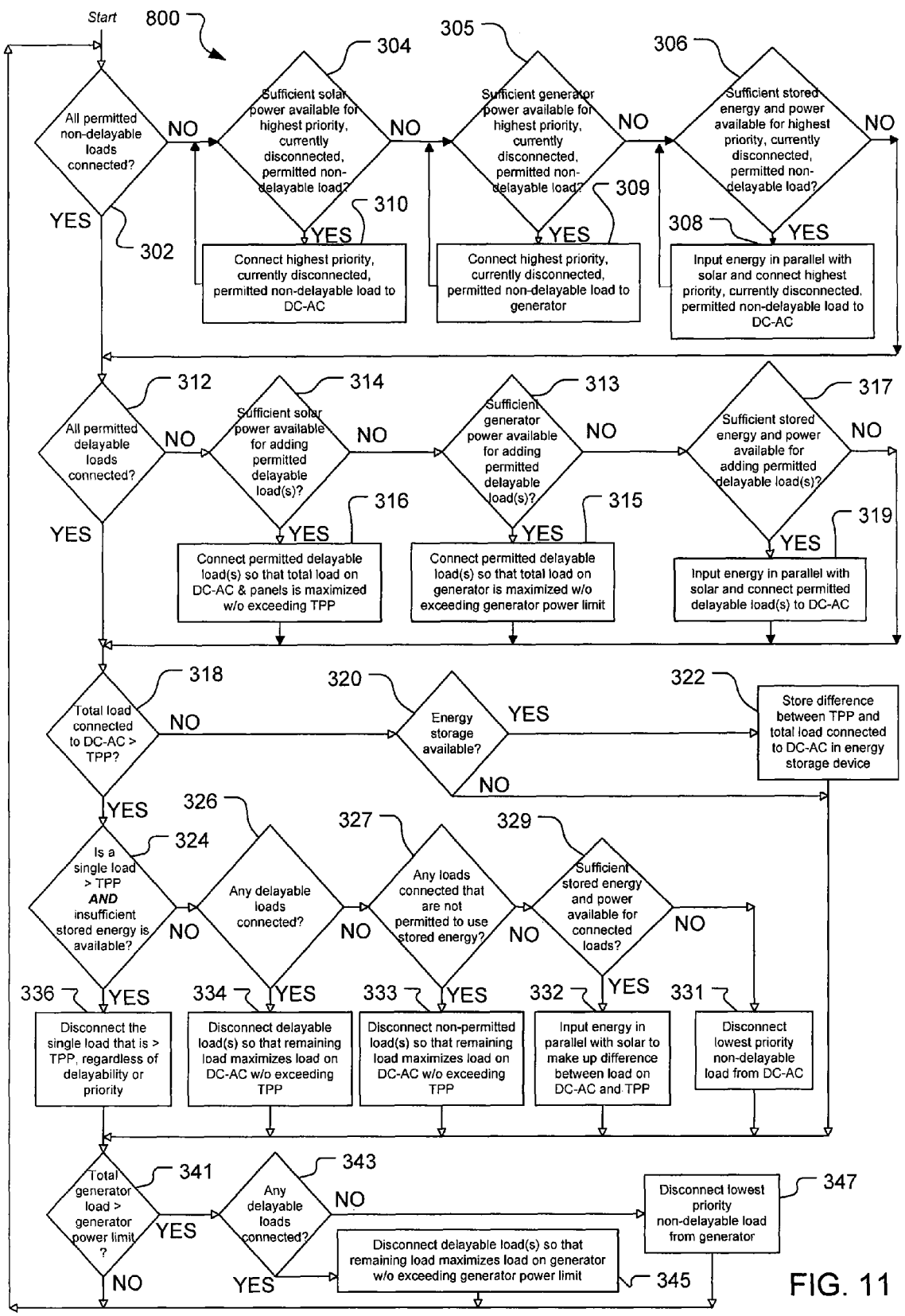
FIG. 11 is a block flow diagram of portions of the flow diagram shown in FIG. 4.

In operation, referring to FIG. 11, with further reference to FIGS. 1-4, 6, 7, and 9, a process 800 includes the stages shown. The process 800 is an exemplary embodiment of portions of the process 710 shown in FIG. 7, and shares many features with the process 300 shown in FIG. 10. In the process 800, stages similar to those in FIG. 10 have identical numbers and their descriptions are supplemented, altered for the process 800, or omitted in this discussion. The process 800 controls power provision to loads from alternative power sources, here a solar power source, e.g., solar panels 16 (although the process 800 is not limited to solar power), an AC generator such as generator 904, and an energy storage device such as the device 234. The process 800 is exemplary only and not limiting. The process 800 may be altered, e.g., by having stages added, removed, or rearranged. For example, stages 326 and 327 discussed below may have their order interchanged (along with corresponding stages 333, 334). The process 800 shows that power is preferably used according to a priority of solar power first, then generator power, then stored energy. The process 800 also shows that there is a preference to connect non-delayable loads before delayable loads, and if power consumption is to be reduced, to shed delayable loads before non-delayable loads, and to shed loads not permitted to use stored energy before using or increasing the use of stored energy.

At stages 302 and 312, inquiries are made as to whether all permitted non-delayable or delayable loads are connected, respectively. Only if a non-connected non-delayable load is permitted to receive power from one of the alternative energy sources will the process 800 proceed from stage 302 to stage 304. Similarly, only if a non-connected delayable load is permitted to receive power from one of the alternative energy sources will the process 800 proceed from stage 312 to stage 314.

Stages 304, 305, 306, 308, 309, 310 illustrate that a controller analyzes whether power is available from the alternative sources in order of priority for powering the currently-disconnected, highest-priority, non-delayable loads. If there is appropriate power available, and the source/load combination is permitted (authorized), then the load is connected to the appropriate DC-to-AC converter (e.g., for the sources 16, 234), and/or to the generator. After stages 308, 309, and 310, the process returns to stages 306, 305, and 304, respectively, to determine if another load may be connected due to sufficient available stored energy, generator power, or solar power, respectively.

Stages 313, 314, 315, 316, 317, 319, illustrate that a controller analyzes whether power is available from the alternative sources in order of priority for powering the currently-disconnected delayable loads. At stage 315, the appropriate load(s) is(are) connected to the generator so that a total load on the generator is preferably maximized without exceeding a power limit of the generator. At stage 319, power from the energy storage device is input in parallel with solar power, if any, provided to the corresponding load(s).

Decision stages 326, 327, and 329, and their associated operation stages, illustrate that if the power drawn from the DC-to-AC converter exceeds available power, delayable loads are disconnected before using stored energy to power the loads. At stage 334, with it having been determined at stage 326 that at least one delayable load is connected, one or more connected delayable loads are selected and disconnected to try to maximize load on the DC-to-AC converter without exceeding the TPP. At stage 327, with no delayable loads connected, the controller inquires as to whether any connected loads are not permitted to use stored energy. If there are such loads, then the process 800 proceeds to stage 333 where one or more non-delayable loads not permitted to use stored energy are disconnected to try to maximize the load on the DC-to-AC converter without exceeding the TPP. At stage 329, with only non-delayable loads permitted to use stored energy connected to draw power, the controller determines if there is sufficient stored energy available to power the connected loads. If there is sufficient power, then the process 800 proceeds to stage 332, and otherwise proceeds to stage 331. At stage 331, the controller causes the lowest priority non-delayable load to be disconnected, thereby ceasing to draw power.

At stage 341, the controller determines whether a total load on the generator is greater than the generator power limit. If not, then the process 800 returns to stage 302, and otherwise proceeds to stage 343.

At stage 343, the controller determines whether there are any delayable loads connected. If there are no delayable loads currently connected, then the process 800 proceeds to stage 347 where the controller causes the lowest priority non-delayable load to be disconnected, thereby ceasing to draw power. If the controller determines at stage 343 that there are delayable loads connected, then the process 800 proceeds to stage 345.

At stage 345, with the controller having determined that there are delayable loads connected for receiving power, one or more delayable loads are disconnected. The controller actuates one or more appropriate load switches to disconnect and connect (as appropriate) one or more delayable loads so that the remaining combination of connected loads draws as much power as possible, given the power draws of the presently connected delayable loads, from the generator without exceeding the generator's power limit if possible. The process 800 returns to stage 302.

FIG. 11 is exemplary, and many modifications are possible. For example, flow from stages 333 and 334 may proceed to stage 318 instead of 341, which may increase the speed at which a steady state of connected loads is reached. Further, loads may be assigned maximum off times and/or minimum on times, and/or may have their permissions changed, and/or may have their characteristics (e.g., delayable/non-delayable status) changed. Preferably, if status or permission is changed, it is changed on a temporary basis. The duration of the change may be constant, or may vary depending on desired criteria (e.g., time of day). Thus, for example, a delayable load may be assigned a maximum off time which, if exceeded, causes the controller to reassign the load temporarily from delayable status to non-delayable status. As another example, a load not permitted to use stored energy may have its permission changed temporarily to allow it to use stored energy, e.g., if its assigned maximum off time is exceeded. Further, these alternatives apply to embodiments other than that shown in FIG. 11, e.g., other embodiments of FIG. 7 including embodiments of FIG. 10.

Still other embodiments are within the scope of the description and claims. For example, DC-AC converters and controllable switches may be physically disposed in a common container or box. Further, control and/or sensor functionality may be contained in DC-AC converters. Also, the converter 238 is shown in FIG. 6 with a single pair of inputs or ports for receiving DC power from multiple DC sources, but in practice the single pair of inputs shown in FIG. 6 may be implemented with multiple pairs of physically separate inputs. The multiple pairs may be connected to different points of the converter 238, e.g., with lines from the solar panels 16 connected to a voltage boost stage, and lines from the energy storage device 234 connected between the boost stage and a DC-to-AC conversion stage. The single pair of inputs or multiple pairs of inputs may be referred to as an input. Similarly, multiple physically separate connections between a power delivery system and a power grid may be referred to as an input. Also, the DC power provided from multiple sources may be combined before conversion to AC power or, equivalently, converted to AC power and then combined, with portions of the AC power being derived from their respective DC sources. The AC power provided to one or more AC loads may be solely from one source or from multiple sources (either DC and/or AC). Further, a unidirectional source, e.g., the solar panels, is preferably protected from back-feed of power (as opposed to the bi-directional DC-DC 232), using known techniques such as diodes in the lines connecting the unidirectional source to the DC-AC converter.

Still other embodiments are within the scope of the disclosure and claims. For example, in a grid-tied converter system including an alternative energy source (e.g., solar panels, wind power source, etc.) and an electric panel connected to a power grid and to multiple AC loads, a power converter may be configured to act as a current source inverter providing AC current to the power grid if the power grid is providing an acceptable quality of power and to act as a voltage source inverter providing AC voltage to the AC loads if the power grid is providing an unacceptable quality of power. As a further example, a power converter system may include a DC-to-AC power converter; a first output configured to be coupled to a power grid; a first input configured to be coupled to the power grid; second outputs each configured to be coupled to an AC load; a power-grid switch coupled to the converter and to the first output; load switches coupled to the converter, the second outputs, and the first input; a controller coupled to the load switches and to the first output and configured to determine whether energy from the power grid satisfies at least one criterion, the controller being further configured to control the power-grid switch and the load switches to couple the converter to the first output and to couple the first input to the second outputs if the at least one criterion is satisfied and otherwise to control the power-grid switch and the load switches to isolate the converter from the first output and to selectively couple the converter to the second outputs; a DC source coupled to the controller and to the DC-to-AC power converter; measurement nodes configured to monitor energy provided to AC loads and to provide first information regarding the monitored energy; a usage broadcaster configured to communicate with the measurement nodes and to the controller to receive the first information from the measurement nodes and provide second information, related to the first information, to the controller; and a communication module coupled to the controller and the usage broadcaster and configured to send third information, related to the second information, toward a device and to receive fourth information from the device and send commands related to the fourth information to the controller.

Still other embodiments are within the scope of the disclosure and claims. For example, embodiments of power delivery systems may be used that do not connect to, and possibly do not have a connection for, a power grid. The VSI mode of the DC-to-AC converter is equally applicable whether or not the system can receive power from, or supply power to, a power grid. Where no power grid is to be connected to the power delivery system, some simplifications relative to the systems described above are possible. For example, the load switches preferably would have no connection point for connection to a power grid (e.g., the switches 92-95 in FIG. 3 could have only two terminals for connection to the load terminal), the sensor/controller could be simplified not to include connections and a sensor to sense a grid, and no power grid switch is needed (e.g., the switch 40 in FIG. 3 could be eliminated).

Further, more than one invention may be described herein.

What is claimed is:

1. A power converter system comprising:
    a DC-to-AC power converter configured to receive DC power from at least one DC power source;
    a grid switch coupled to the converter and configured to couple to a power grid;
    a plurality of selective couplings coupled to the converter, the selective couplings including load lines configured to be coupled to AC loads, the selective couplings being configured to selectively couple the converter to the load lines; and
    a controller coupled to the selective couplings and configured to be coupled to the power grid, the controller being configured to determine whether energy from the power grid satisfies at least one criterion and to control the grid switch to isolate the converter from the power grid, and to control the selective couplings to couple the converter to at least one of the load lines if the at least one criterion is unsatisfied, the controller being further configured to control the selective couplings to change a distribution of power provided by the converter to the load lines if power provided to the load lines is above an amount of power available to the converter to dynamically change which loads receive power from the converter while the at least one criterion is unsatisfied.

2. The system of claim 1 wherein the controller is configured to cause the selective couplings to change a distribution of power provided by the converter to the load lines dependent upon at least one criterion other than power drawn on the load lines.

3. The system of claim 2 wherein the controller is configured to cause the selective coupling associated with a presently-connected, lowest-priority, non-delayable AC load to isolate the converter from the respective load line if power provided to the load lines is above an amount of power available to the converter.

4. The system of claim 1 further comprising an energy storage module coupled to the converter and the controller, wherein the controller is configured to disconnect a presently-connected delayable load from the converter before attempting to use energy from the energy storage module to power presently-connected loads if power available from the converter from the at least one solar panel is insufficient to power the presently-connected loads.

5. The system of claim 1 wherein each of the selective couplings are configured to be positioned in a first state connecting a respective one of the load lines to the converter, in a second state connecting a respective one of the load lines to the power grid, and in a third state connecting a respective one of load lines to neither the converter nor the power grid.

6. The system of claim 1 wherein the selective couplings are further configured to couple to an AC power source separate from the power grid.

7. The system of claim 6 whererin each of the selective couplings are configured to be positioned in a first state connecting a respective one of the load lines to the converter, in a second state connecting a respective one of the load lines to the power grid, in a third state connecting a respective one of the load lines to the AC power source, and in a fourth state connecting a respective one of the load lines to neither the converter nor the power grid nor the AC power source.

8. The system of claim 1 wherein the DC-to-AC power converter is configured to receive DC power from a first DC power source through a unidirectional connection, the system further comprising:
    a second DC power source comprising an energy storage device; and
    a bidirectional DC-to-DC converter coupled to the energy storage device and to the DC-to-AC power converter.

9. The system of claim 1 wherein the controller is configured to connect and disconnect loads to and from the converter based upon sources of power for respective loads.

10. A power converter system comprising:
    a DC-to-AC power converter configured to receive DC power from at least one DC power source;
    a grid switch coupled to the converter and configured to couple to a power grid;
    a plurality of selective couplings coupled to the converter, the selective couplings including load lines configured to be coupled to AC loads, the selective couplings being configured to selectively couple the converter to the load lines; and a controller coupled to the selective couplings and configured to be coupled to the power grid, the controller being configured to determine whether energy from the power grid satisfies at least one criterion and to control the grid switch to isolate the converter from the power grid and, if the energy from the power grid does not satisfy the at least one criterion, to selectively couple the converter to the load lines to selectively provide AC power from the DC-to-AC power converter to the load lines dependent upon at least one characteristic associated with the load lines other than power drawn on the load lines to dynamically change the selective coupling of the converter to the outputs to dynamically change which of the AC loads receive power from the converter.

11. The system of claim 10 wherein the at least one characteristic associated with the load lines comprises priority and delayability of the AC loads associated with respective load lines, and the controller is configured to cause the selective coupling associated with a presently-connected, lowest-priority, non-delayable AC load to isolate the converter from the respective load line if power provided to the load lines is above an amount of power available to the converter.

12. The system of claim 11 further comprising an energy storage module coupled to the converter and the controller, wherein the controller is configured to disconnect a presently-connected delayable load from the converter before attempting to use energy from the energy storage module power presently-connected loads if power available from the converter from the at least one solar panel is insufficient to power the presently-connected loads.

13. The system of claim 10 wherein the at least one characteristic associated with the load lines comprises permitted power sources for the AC loads associated with the respective load lines, and the controller is configured to connect and disconnect loads to and from the converter based upon the permitted sources of power for respective loads.

14. The system of claim 10 further comprising a first DC source that is unidirectionally coupled to the DC-to-AC power converter to supply DC power to the DC-to-AC power converter, the system further comprising:
 a second DC source comprising an energy storage device; and
 a bidirectional DC-to-DC converter coupled to the energy storage device and to the DC-to-AC power converter.

15. The system of claim 10 further comprising a bidirectional DC-to-DC converter coupled to the DC-to-AC converter and configured to couple to an energy storage device.

16. The system of claim 10 wherein the first DC source comprises at least one of a DC-output generator and at least one solar panel.

17. The system of claim 10 wherein the at least one characteristic is at least one of whether a particular output is permitted to receive power from a particular source, and whether a particular output is associated with a delayable AC load.

18. The system of claim 10 further comprising an AC generator coupled to the load switches.

* * * * *